United States Patent
Beattie, Jr.

(10) Patent No.: US 9,900,733 B2
(45) Date of Patent: Feb. 20, 2018

(54) SEARCH AND RECOVERY OF MOBILE DEVICES

(71) Applicant: AT&T Intellectual Property I, L.P., Atlanta, GA (US)

(72) Inventor: James Gordon Beattie, Jr., Bergenfield, NJ (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 141 days.

(21) Appl. No.: 14/528,113

(22) Filed: Oct. 30, 2014

(65) Prior Publication Data

US 2016/0127862 A1    May 5, 2016

(51) Int. Cl.
| | | |
|---|---|---|
| H04W 24/00 | (2009.01) | |
| *H04W 4/02* | (2018.01) | |
| *G08B 21/18* | (2006.01) | |

(52) U.S. Cl.
CPC ............. *H04W 4/02* (2013.01); *G08B 21/182* (2013.01)

(58) Field of Classification Search
CPC ............................... H04W 4/02; G08B 21/182
USPC ............................................ 455/567; 726/34
See application file for complete search history.

(56) References Cited

U.S. PATENT DOCUMENTS

| | | |
|---|---|---|
| 7,409,219 B2 | 8/2008 | Levitan |
| 8,072,379 B2 | 12/2011 | Gopinath |
| 8,548,499 B2 | 10/2013 | Ortiz et al. |
| 8,644,845 B2 | 2/2014 | Lee et al. |
| 8,712,432 B2 | 4/2014 | Loveland |
| 9,386,106 B1 * | 7/2016 | Perumal et al. ........ H04L 67/18 726/34 |
| 2001/0004591 A1 * | 6/2001 | Jeong ..................... H04M 3/38 455/419 |
| 2005/0096102 A1 | 5/2005 | Mock et al. |
| 2006/0293090 A1 * | 12/2006 | Adams .............. H04M 1/72522 455/567 |
| 2008/0004041 A1 | 1/2008 | Ahn et al. |
| 2009/0251318 A1 * | 10/2009 | Ho .......................... G08B 13/14 340/571 |
| 2010/0173615 A1 * | 7/2010 | Harris ................ H04M 3/42348 455/414.1 |
| 2012/0075099 A1 * | 3/2012 | Brown ..................... G08B 5/36 340/540 |
| 2013/0090110 A1 | 4/2013 | Cloonan et al. |
| 2013/0150020 A1 | 6/2013 | Nagy et al. |
| 2013/0260784 A1 | 10/2013 | Lutz |

(Continued)

FOREIGN PATENT DOCUMENTS

JP        2012080434 A  *  4/2012

OTHER PUBLICATIONS

Translation of JP2012080434A by Okano, listed in Foreign Patent Documents Section. 2012. Eight pages.*

(Continued)

*Primary Examiner* — Joshua Schwartz
(74) *Attorney, Agent, or Firm* — Scott P. Zimmerman, PLLC

(57) ABSTRACT

Search and recovery is performed for a lost or stolen mobile device. When the mobile device is lost or stolen, the mobile device may transmit a recovery signal for receipt by another device. If an acknowledgment is received, the mobile device confirms discovery by sending its current location. Moreover, seeker devices may be conscripted to search for the lost or stolen mobile device.

19 Claims, 38 Drawing Sheets

(56) References Cited

U.S. PATENT DOCUMENTS

2013/0326642 A1* 12/2013 Hajj .................. G06F 21/88
 726/34
2014/0031066 A1 1/2014 Ortiz et al.
2014/0221003 A1 8/2014 Mo et al.

OTHER PUBLICATIONS

Cassavoy, Liane, "Find a Lost iPhone: Putting Tracking Apps to the Test" PC World, Jun. 21, 2011, 7 pages.
Unknown, "Wonder how the "Find My !Phone" Service Helps You Locate Your Device? We Explain How it Works," www.TechNorms.com, Nov. 2011, 7 pages.
Unknown, "iCloud: Find My iPhone overview," Apple, Oct. 2014, 2 pages.

* cited by examiner

SEARCH AND RECOVERY OF MOBILE DEVICES

COPYRIGHT NOTIFICATION

A portion of the disclosure of this patent document and its attachments contain material which is subject to copyright protection. The copyright owner has no objection to the facsimile reproduction by anyone of the patent document or the patent disclosure, as it appears in the Patent and Trademark Office patent files or records, but otherwise reserves all copyrights whatsoever.

BACKGROUND

A lost device is all too common. Perhaps everyone has misplaced his or her smartphone. There are many ways to find a lost device, yet conventional recovery techniques may be ineffective when a battery is low.

BRIEF DESCRIPTION OF THE SEVERAL VIEWS OF THE DRAWINGS

The features, aspects, and advantages of the exemplary embodiments are better understood when the following Detailed Description is read with reference to the accompanying drawings, wherein.

DETAILED DESCRIPTION

The exemplary embodiments will now be described more fully hereinafter with reference to the accompanying drawings. The exemplary embodiments may, however, be embodied in many different forms and should not be construed as limited to the embodiments set forth herein. These embodiments are provided so that this disclosure will be thorough and complete and will fully convey the exemplary embodiments to those of ordinary skill in the art. Moreover, all statements herein reciting embodiments, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating the exemplary embodiments. The functions of the various elements shown in the figures may be provided through the use of dedicated hardware as well as hardware capable of executing associated software. Those of ordinary skill in the art further understand that the exemplary hardware, software, processes, methods, and/or operating systems described herein are for illustrative purposes and, thus, are not intended to be limited to any particular named manufacturer.

As used herein, the singular forms "a," "an," and "the" are intended to include the plural forms as well, unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

It will also be understood that, although the terms first, second, etc. may be used herein to describe various elements, these elements should not be limited by these terms. These terms are only used to distinguish one element from another. For example, a first device could be termed a second device, and, similarly, a second device could be termed a first device without departing from the teachings of the disclosure.

Figure 1:
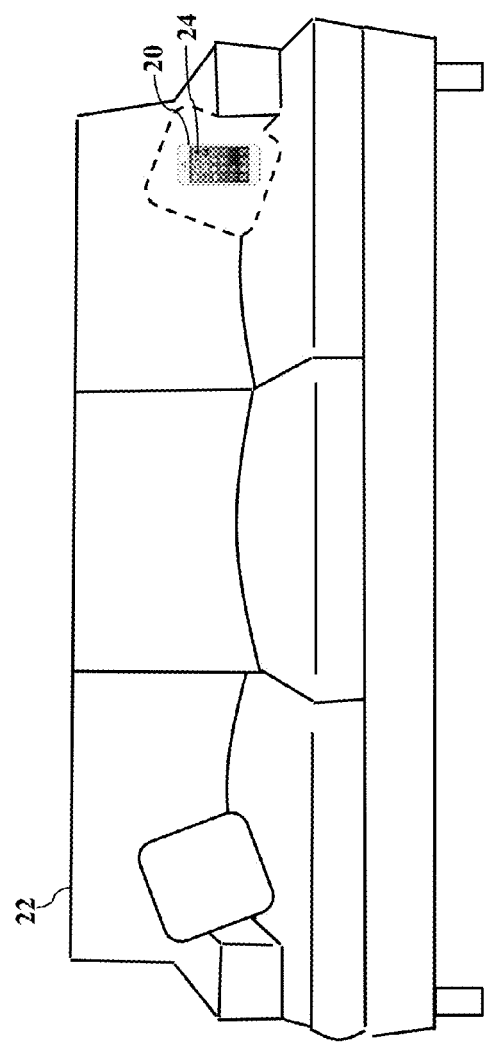
FIGS. 1-9 are simplified schematics illustrating an environment in which exemplary embodiments may be implemented.

FIGS. 1-9 are simplified schematics illustrating an environment in which exemplary embodiments may be implemented. FIG. 1 illustrates a mobile device 20 lost behind a pillow of a couch 22. The mobile device 20 is illustrated as smartphone 24, which nearly everyone has lost at one time or another. The mobile device 20, though, may be any processor-controlled device, as later paragraphs will explain. Here, though, the mobile device 20 gathers information and automatically determines when it is lost. Exemplary embodiments may then automatically implement measures to find the lost mobile device 20. That is, whenever the mobile device 20 is lost, exemplary embodiments proactively implement a search and recovery campaign. Indeed, exemplary embodiment may even conscript other nearby devices to search for the lost mobile device 20, as later paragraphs will explain.

Figure 2:
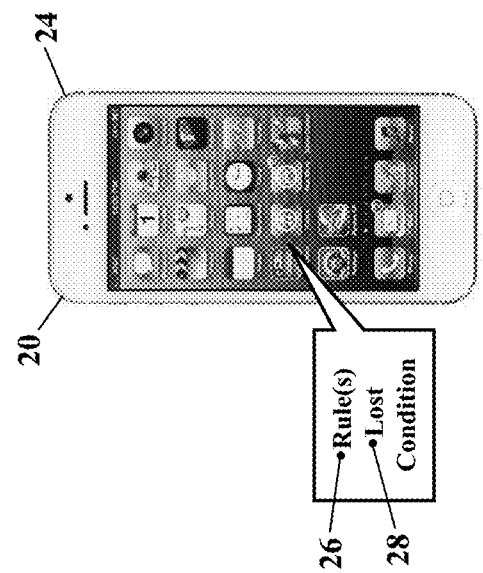

FIG. 2 illustrates the mobile device's self-determination of being lost. The mobile device 20 may automatically determine when it is lost. The mobile device 20, for example, may gather many different kinds of information and execute one or more rules 26. Each rule 26 may be any logical expression that determines when the mobile device 20 is lost. If any one or more of the rules 26 are satisfied, then the mobile device 20 may conclude or infer a lost condition 28. The mobile device 20, in other words, may autonomously determine when it is lost, misplaced, or even stolen.

Figure 3:
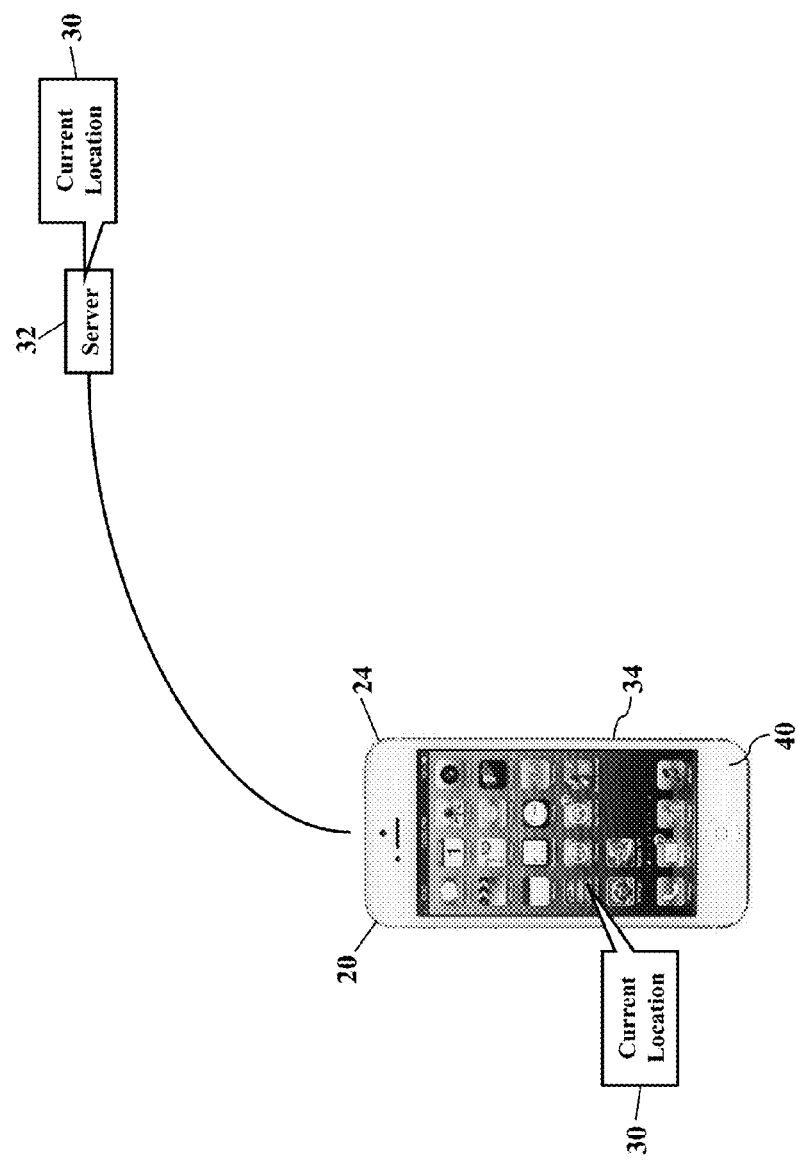

FIG. 3 illustrates locational reporting by the mobile device 20. Whenever the mobile device 20 is lost, the mobile device 20 may automatically report its current location 30 to a server 32. The mobile device 20, for example, may retrieve the current location 30 using a global positioning system (or "GPS") 34, which is well known and need not be explained in detail. The mobile device 20 uploads the current location 30 to the server 32. The server 32 is thus notified of the current location 30 of the lost mobile device 20. The server 32 may then notify an owner or user, thus promoting recovery of the mobile device 20.

Unfortunately, though, a battery 40 of the mobile device 20 may be low. When the mobile device 20 is lost, a life of the battery 40 is important for recovery. As the reader likely understands, as the battery 40 is consumed, the mobile device 20 may lose functionality, thus making recovery even more difficult. When the mobile device 20 is lost, there must be sufficient electrical power stored in the battery 40 to function. If the battery 40 is too low in charge, for example, the global positioning system 34 may not function. Even wireless transmission may require more power than the battery 40 can provide.

Figure 4:
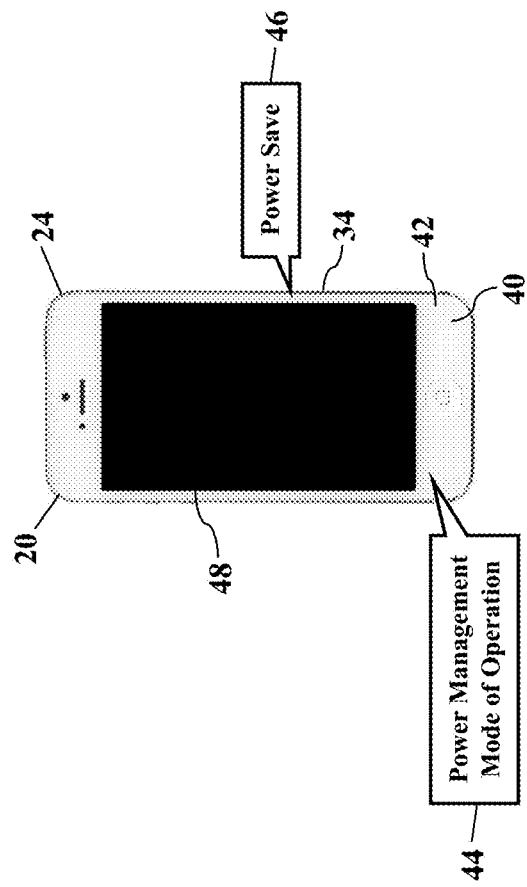

FIG. 4 thus illustrates a power management mechanism. When the mobile device 20 is lost, exemplary embodiments may implement measures to conserve electrical power 42 stored in the battery 40. By having the mobile device 20 conserve its battery 40, the electrical power 42 is conserved, thus resulting in faster recovery. Exemplary embodiments, for example, may enter a power management mode 44 of operation in which less important features and systems are disabled or idled. The global positioning system 34 may be instructed to power save 46, thus idling, sleeping, or hibernating to conserve the battery 40. A display device 48 may also be instructed to power save 46, as visual functionality is not needed when the mobile device 20 is lost. Other non-essential features and applications may power save 46 to further conserve the battery 40.

Figure 5:
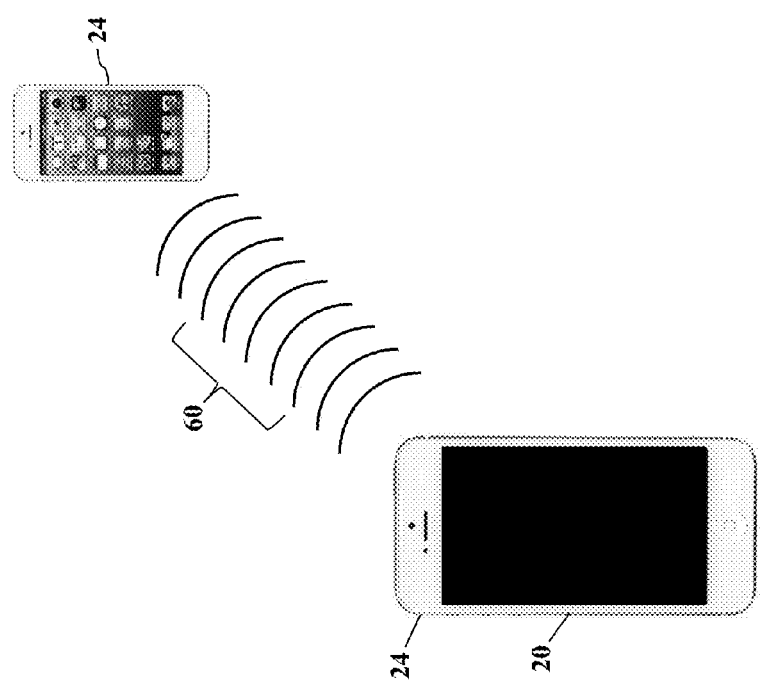
Figure 6:
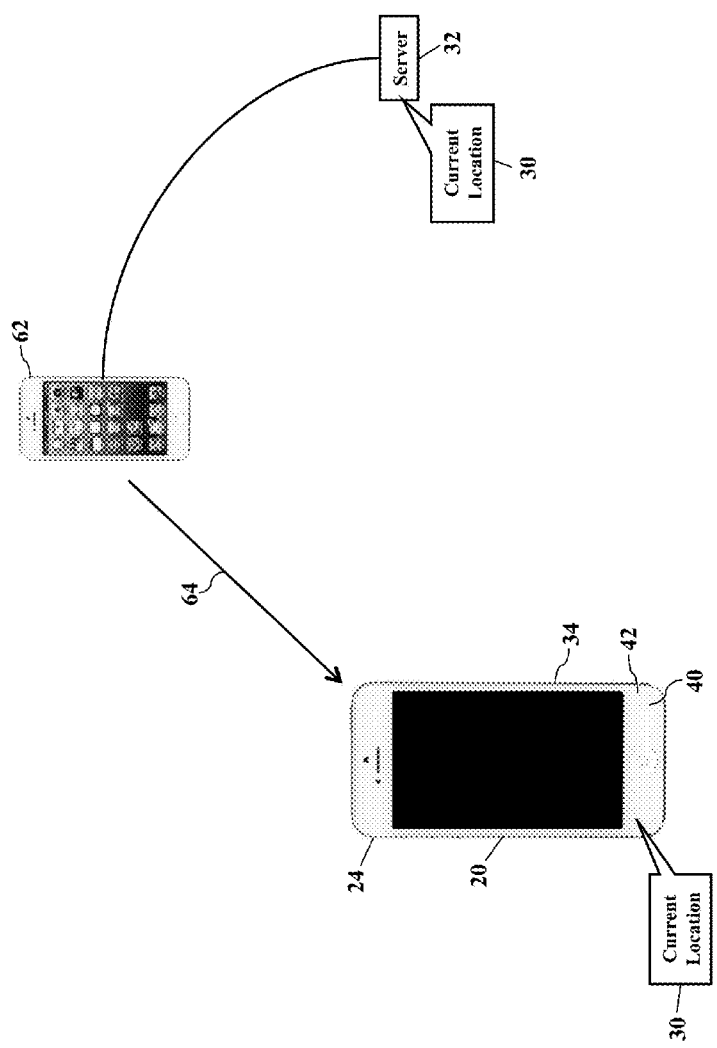

FIGS. 5-6 illustrate a recovery mechanism. Even though the mobile device 20 may be lost, the mobile device 20 may implement measures for recovery. That is, exemplary embodiments promote finding and recovering the lost mobile device 20. For example, the mobile device 20 may wirelessly transmit a recovery signal 60. The recovery signal 60 may be broadcast for receipt by any other device. FIG. 5, for example, illustrates another passing mobile device 62 receiving the recovery signal 60. Even though the mobile device 20 is lost, in today's mobile environment, there may be many people, likely with their own mobile device 62, passing or moving within wireless reception range. Of course, a stationary device (such as a desktop computer or kitchen appliance) may receive the recovery signal 60. Regardless, when the recovery signal 60 is received, the passing mobile device 62 may respond with an acknowledgement 64, as FIG. 6 illustrates. When the lost mobile device 20 receives the acknowledgement 64, the lost mobile device 20 now knows discovery has been accomplished. That is, the lost mobile device 20 knows that the passing mobile device 62 is within wireless reception range. The lost mobile device 20 may then retrieve and send its current location 30 back to the passing mobile device 62. The passing mobile device 62 may then pass along or upload the current location 30 to some destination, such as the network address of the server 32. The server 32 is thus notified of the current location 30 of the lost mobile device 20. The server 32 may then notify the owner, thus promoting recovery of the mobile device 20.

Figure 7:
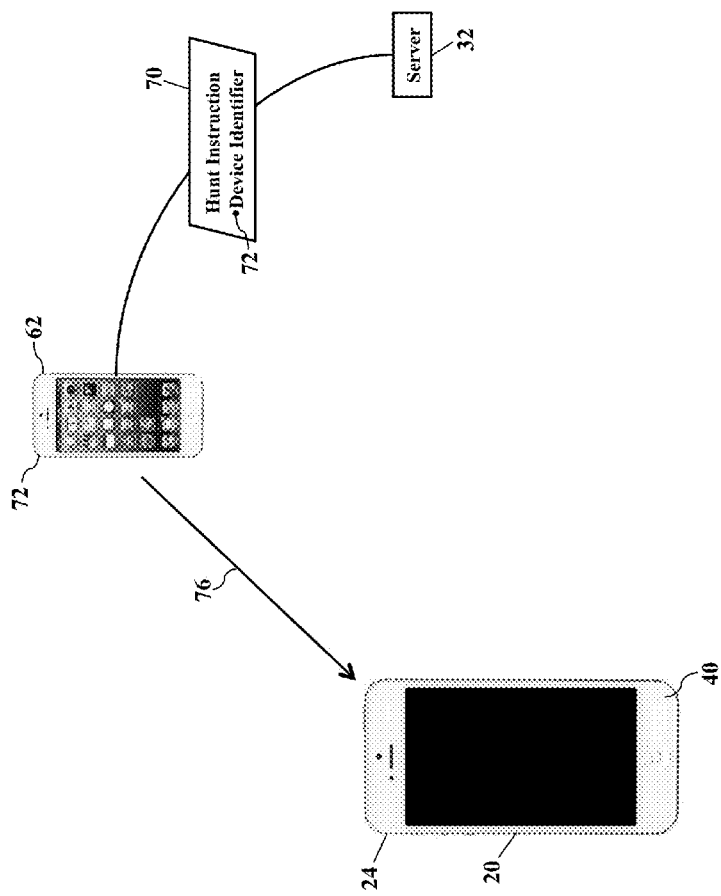
Figure 8:
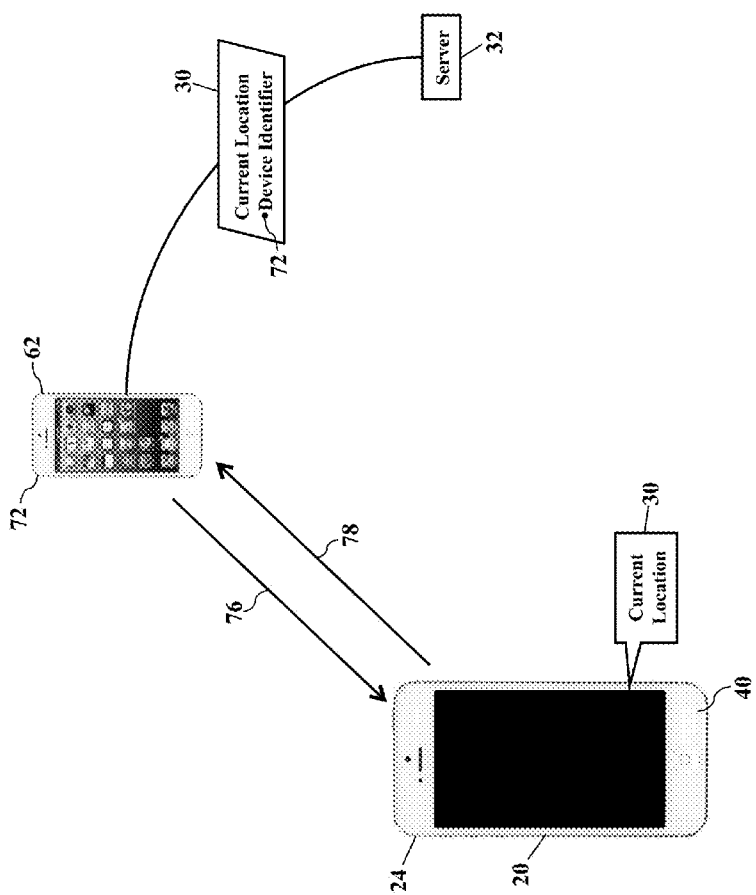

FIGS. 7-8 illustrate a further recovery mechanism. Here exemplary embodiments instruct the passing mobile device 62 to hunt for, or seek out, the lost mobile device 20. The server 32, for example, may receive a report of the lost mobile device 20. Once the owner realizes the mobile device 20 is lost, the server 32 may be electronically notified of the loss. The server 32 may thus broadcast a hunt instruction 70 to spur discovery. FIG. 7, for simplicity, illustrates the passing mobile device 62 receiving the hunt instruction 70. The hunt instruction 70, though, may be received by many mobile and stationary devices in any area, as later paragraphs will explain. For now, though, the hunt instruction 70 instructs the passing mobile device 62 to hunt for, or seek out, a device identifier 72 of the lost mobile device 20. The device identifier 72 uniquely identifies the lost mobile device 20. The server 32, in other words, may conscript any mobile and/or stationary device to become a seeker device 74 and to transmit an interrogation signal 76. The interrogation signal 76 may even specify the device identifier 72 associated with the lost mobile device 20. The seeker device 74 thus searches for the lost mobile device 20, in response to the hunt instruction 70.

FIG. 8 illustrates recovery. When the lost mobile device 20 receives the interrogation signal 76, the lost mobile device 20 generates a response 78. The mobile device 20 retrieves and sends its current location 30 to the seeker device 74. When the seeker device 74 receives the current location 30, the seeker device 74 has thus discovered the previously lost mobile device 20. The seeker device 74 sends the current location 30 back to the server 32, thus notifying the server 32 of the current location 30 of the now-found mobile device 20 (as identified by the device identifier 72). The server 32 may then again notify an owner or user that the mobile device 20 has been found at the current location 30.

Figure 9:
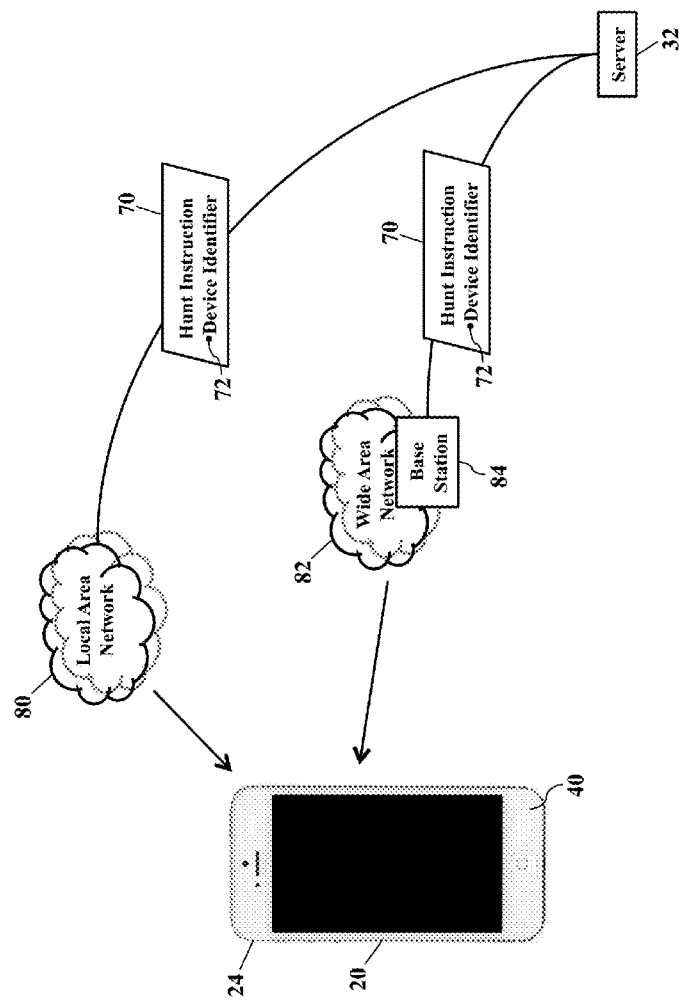

FIG. 9 further illustrates conscription. Exemplary embodiments may conduct a small or large area search for the lost mobile device 20, using any or all other wireless devices in any locale. FIG. 9, for example, illustrates a search of a local area network 80. As the reader may understand, many homes have a WI-FI®, BLUETOOTH®, or other local area network 80. Indeed, many coffee shops, stores, hotels, and restaurants also offer the wireless or wired local area network 80 to their customers. When the mobile device 20 is reported lost, the server 32 may first conscript the mobile and stationary devices in any local area network 80. If the owner of the lost mobile device 20 can remember the approximate location of last use, the corresponding local area network 80 may be a good first place to start recovery efforts. Exemplary embodiments may thus conscript the devices currently registered with the local area network 80 (using the hunt instruction 70). However, if the mobile device 20 is not found, exemplary embodiments may expand the search to a wide area network 82 (such as a cellular network). The server 32, for example, may instruct a cellular base station 84 to conscript some or all of the cellular devices within its broadcast cell coverage. For example, smartphones, tablets, and vehicles may thus be instructed to search for the lost mobile device 20. The server 32 may thus quickly and efficiently conduct a local area search, and even a wide area search, for the lost mobile device 20, using hundreds or thousands of seeker devices (illustrated as reference numeral 74 in FIGS. 7-8).

Exemplary embodiments thus locate the misplaced or lost mobile device 20. When the mobile device 20 is lost, the mobile device 20 may, or may not, have an ability to reach a communications network (such as the local area network 80 and the wide area network 82). If the lost mobile device 20 can access a communications network, exemplary embodiments may initiate a search and recovery operation within seconds of notification. However, if the lost mobile device 20 cannot locate and register with a network access point, the lost mobile device 20 may quickly drain its battery 40. Exemplary embodiments may thus moderate this normal device behavior in order to optimize its chance of recovery.

Exemplary embodiments thus improve recovery. Power resources may be managed by listening for nearby devices on cellular, WI-FI®, BLUETOOTH®, and any other frequencies. The battery 40 may be conserved by transmitting to a passing or nearby connectivity partner (such as the passing mobile device 62 and/or the seeker device 74). Exemplary embodiments may thus rely on the connectivity partner to capture and to forward the current location 30 to a centralized clearinghouse, such as the server 32. Indeed, even more parameters may be sent, such as the current time, signal strength, and the wireless standard or technology used by the lost mobile device 20 and the connectivity partner. The current location 30 of the lost mobile device 20 may thus be mapped for quick recovery.

Figure 10:
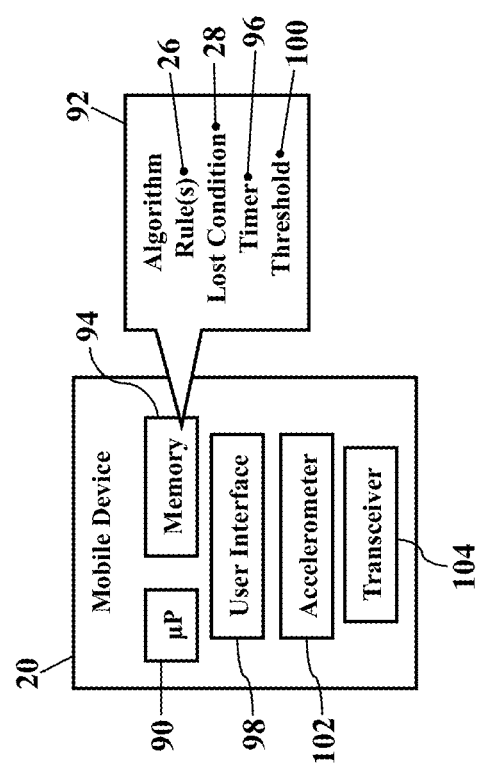
FIG. 10 is a more detailed block diagram illustrating a mobile device, according to exemplary embodiments.

FIG. 10 is a more detailed block diagram illustrating the lost mobile device 20, according to exemplary embodiments. The mobile device 20 has a processor 90 (e.g., "μP"), application specific integrated circuit (ASIC), or other component that executes an algorithm 92 stored in a memory 94. The algorithm 92 is a set of programming, code, or instructions that cause the processor 90 to perform operations, such as determining the mobile device 20 is lost. For example, the algorithm 92 may execute the one or more rules 26 that determine the lost condition 28. A timer 96, for example, may be initialized to count up or down, perhaps to a final value. A current value of the timer 96 may then be evaluated by the rules 26 to conclude the mobile device 20 is lost. One such rule 26, for example, may count a time without inputs to a user interface 98. As the reader understands, the mobile device 20 may have a keypad, touch screen, buttons, or other input devices. If the user interface 98 fails to receive a user input by some threshold value 100 of the timer 96, exemplary embodiments may infer the mobile device 20 is lost. Similarly, if an accelerometer 102 fails to generate an output signal (from motion) by the threshold value 100 of the timer 96, exemplary embodiments may infer the mobile device 20 is lost. Indeed, exemplary embodiments may infer the lost condition 28 based on any feature or application being inactive for some period of time. Whenever the mobile device 20 is lost, the mobile device 20 may then use its transceiver 104 for recovery efforts, as will be explained.

Immobility or inactivity of the mobile device 20, though, may not be an accurate indication. For example, even though the mobile device 20 is immobile, its user may be sleeping. Exemplary embodiments, then, may exclude immobility or inactivity during sleeping hours. The algorithm 92, for example, may decline to infer the lost condition 28, based on settings for silencing a ringer or other notifications. Hours or patterns of immobility or inactivity may be learned from habitual usage, such as sleeping and eating times. If the mobile device 20 is receiving electrical power from an external charger, immobility or inactivity may also be excluded from the lost condition 28. Indeed, if the mobile device 20 is being charged, then perhaps there is no need to limit features and functions to conserve the battery 40.

Figure 11:
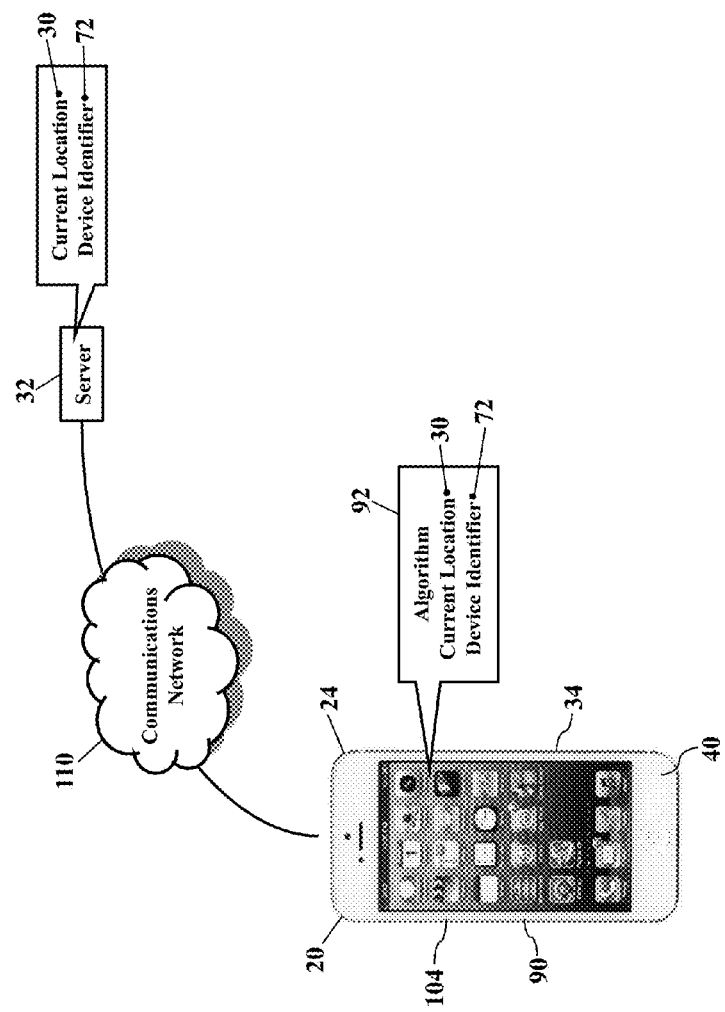
FIG. 11 is a schematic illustrating locational reports, according to exemplary embodiments.

FIG. 11 is a schematic illustrating locational reports, according to exemplary embodiments. Here the mobile device 20 may randomly or periodically report its current location 30 to the server 32. Assume, for example, every fifteen (15) minutes the algorithm 92 instructs the global positioning system 34 to determine the current location 30. The algorithm 92 then causes the processor 90 to send the current location 30 to the transceiver 104 for transmission. The transceiver 104 wirelessly sends the current location 30 into a communications network 110 (such as the local area network 80 and the wide area network 82 illustrated in FIG. 9) for routing to the network address associated with the server 32. The transceiver 104 also sends the unique device identifier 72 of the mobile device 20. As those of ordinary skill understand, every wireless device may have the unique alphanumeric device identifier 72. The mobile device 20, for example, may be uniquely identified by its telephone number, IP address, media access control address (or "MAC address"), transceiver identifier, or any other differentiator. Whatever the unique device identifier 72, the server 32 stores the device identifier 72 in association with the current location 30. The server 32 is thus notified of the current location 30 of the mobile device 20. The server 32 may then notify an owner or user, thus promoting recovery of the mobile device 20.

Exemplary embodiments may thus report when lost. Whenever the mobile device 20 is lost, the algorithm 92 may cause the mobile device 20 to automatically report the current location 30. The mobile device 20 may initiate a locational report, or the mobile device 20 may be instructed to report its current location 30. The mobile device 20 may thus self-report when lost.

Figure 12:
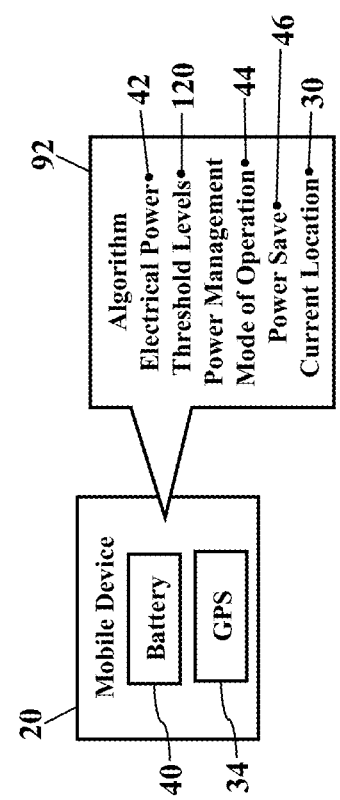
FIG. 12 is a schematic illustrating power management, according to exemplary embodiments.
Figure 13:
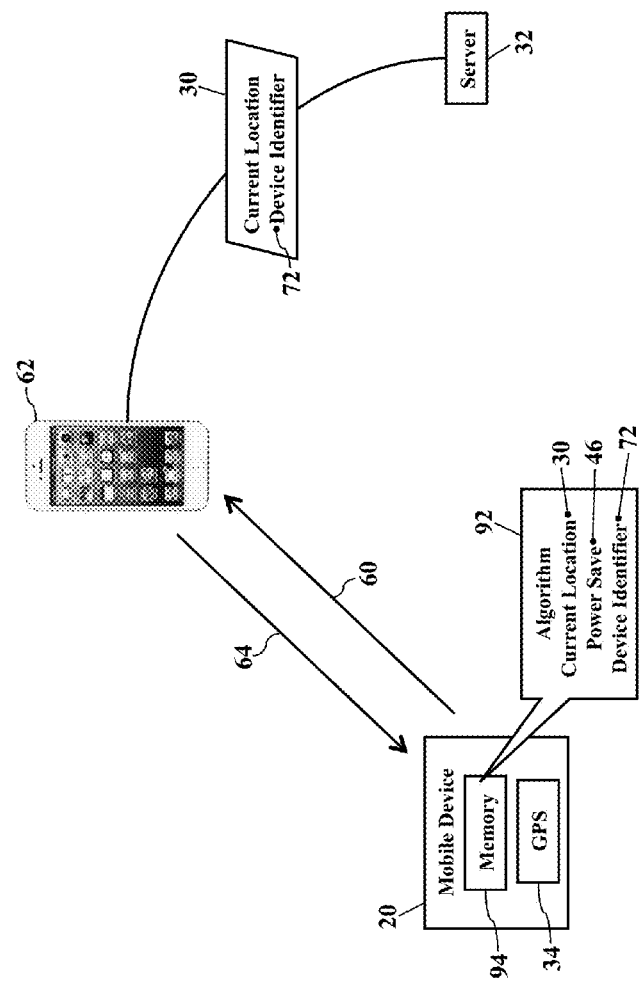
FIGS. 13-16 are schematics illustrating a recovery mechanism, according to exemplary embodiments.

FIG. 12 is a schematic illustrating power management, according to exemplary embodiments. If the mobile device 20 lacks connectivity, the locational report (as illustrated by FIG. 11) may be unsuccessful. Indeed, the mobile device 20 may continually search for network connectivity, thus consuming the power available from the battery 40. Over time, then, the battery 40 will become fully discharged, perhaps thwarting recovery. Exemplary embodiments, though, may implement power management to increase the chance of recovery. The algorithm 92 may compare the electrical power 42 available from the battery 40 to one or more threshold power levels 120. Whenever the current electrical power 42 is equal to or less than any of the threshold power levels 120, the algorithm 92 may execute the power management mode 44 of operation. The mobile device 20 thus begins conserving electrical power consumed from the battery 40. The mobile device 20, for example, may disable, idle, sleep, or hibernate less important and/or non-essential features and applications. The power management mode 44 of operation thus reduces power consumption from the battery 40. Some features and applications may still consume a small or negligible amount of electrical power, while other features or applications may consume no electrical power.

The global positioning system 34, for example, enters the power save 46. The global positioning system 34, under normal operating conditions, may periodically be called to generate the current location 30. During the power management mode 44 of operation, however, the global positioning system 34 may sleep or idle, thus consuming much less electrical power. Exemplary embodiments, in other words, may suspend repeated or periodic generation of the current location 30. As the mobile device 20 is lost, there may be no need to repeatedly determine the current location 30, especially when immobile or inactive.

FIGS. 13-16 are schematics illustrating a recovery mechanism, according to exemplary embodiments. If the mobile device 20 is ever lost, the mobile device 20 may encourage its own discovery. The algorithm 92, for example, causes the lost mobile device 20 to wirelessly transmit the recovery signal 60. The recovery signal 60 is broadcast for receipt by any other device, such as the passing mobile device 62. When the passing mobile device 62 receives the recovery signal 60, the passing mobile device 62 sends the acknowledgement 64 back to the lost mobile device 20.

The lost mobile device 20 may thus quickly act. The acknowledgement 64 confirms that the passing mobile device 62 has discovered the lost mobile device 20. The passing mobile device 62, though, may move beyond the transmission range of the lost mobile device 20. The algorithm 92 may thus cause the lost mobile device 20 to retrieve the current location 30 from the memory 94. Exemplary embodiments may thus retrieve the current location 30 previously generated by the global positioning system 34, prior to the power save 46. The lost mobile device 20 sends the current location 30 back to the passing mobile device 62, along with the device identifier 72. The passing mobile device 62 may then forward the current location 30 to the network address of the server 32. The server 32 is thus notified of the current location 30 of the formally lost mobile device 20. The server 32 may then notify the owner, thus promoting recovery of the mobile device 20.

Figure 14:
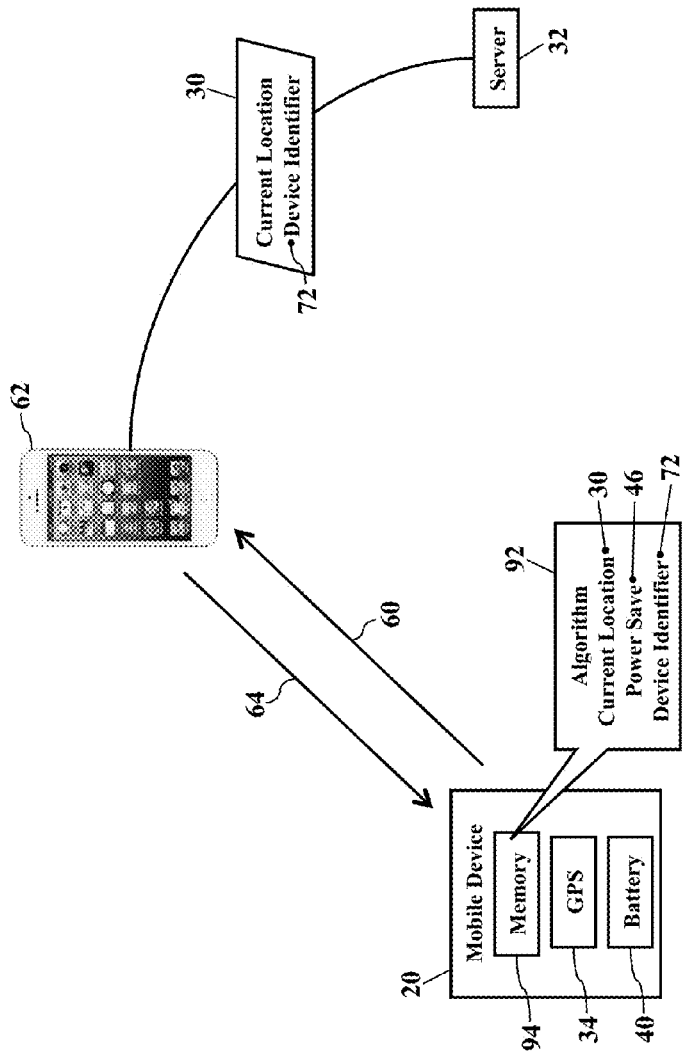

FIG. 14 further illustrates the power save 46. Here exemplary embodiments may revive the functionality of the global positioning system 34, despite the power save 46. Recall that the power save 46 sleeps or idles the global positioning system 34 to conserve electrical power in the battery 40. If the mobile device 20 has been determined lost for some period of time, the GPS location stored prior to the power save 46 may be inaccurate. Exemplary embodiments, then, may awaken the global positioning system 34 to generate a new value of the current location 30. The mobile device 20 may thus send the latest current location 30 back to the passing mobile device 62, and the passing mobile device 62 forwards the latest current location 30 to the server 32.

Figure 15:
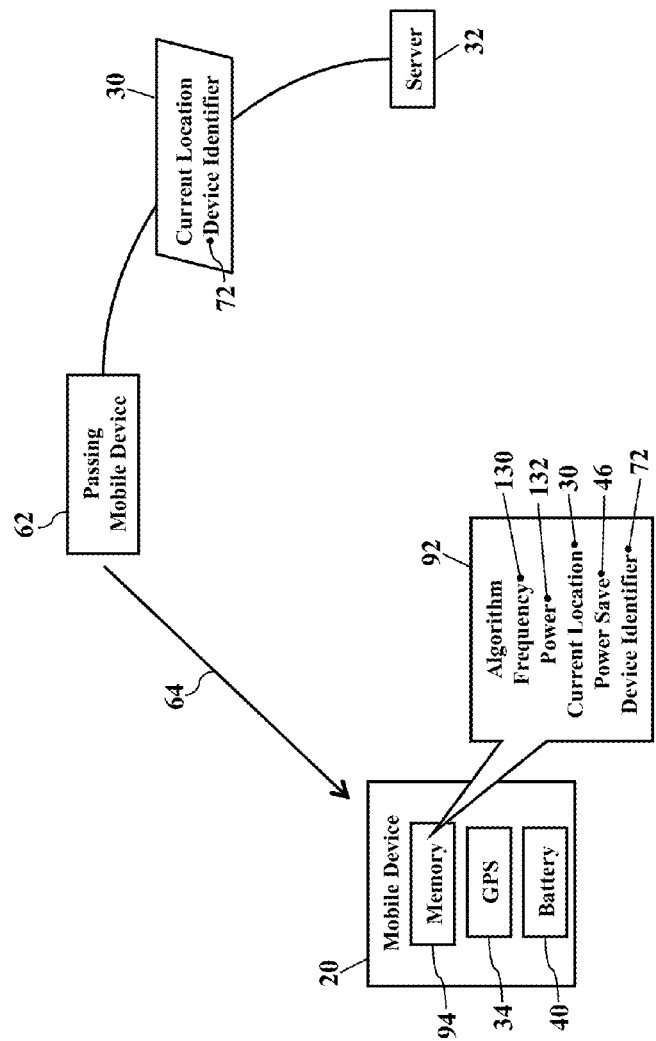

FIG. 15 illustrates reception considerations. Awakening the global positioning system 34 may take a few or several extra seconds of processing time. Transmission of the latest current location 30 is thus delayed while the global positioning system 34 awakens and regenerates the latest current location 30. Any delay in transmission, though, may jeopardize receipt by the passing mobile device 62. Indeed, even if the passing mobile device 62 is only moving at pedestrian speeds, a few seconds may put the passing mobile device 62 beyond wireless transmission or reception range. Exemplary embodiments, then, may determine a frequency 130 of, and/or an electromagnetic power 132 transmitted by, the acknowledgement 64 sent from the passing mobile device 62. If the frequency 130 and/or the power 132 indicate a low power transmission from the passing mobile device 62, then the algorithm 92 may retrieve the current location 30 previously generated and stored in the memory 94, prior to the power save 46. Exemplary embodiments may thus decline to awaken the global positioning system 34, as the extra processing time jeopardizes discovery.

Figure 16:
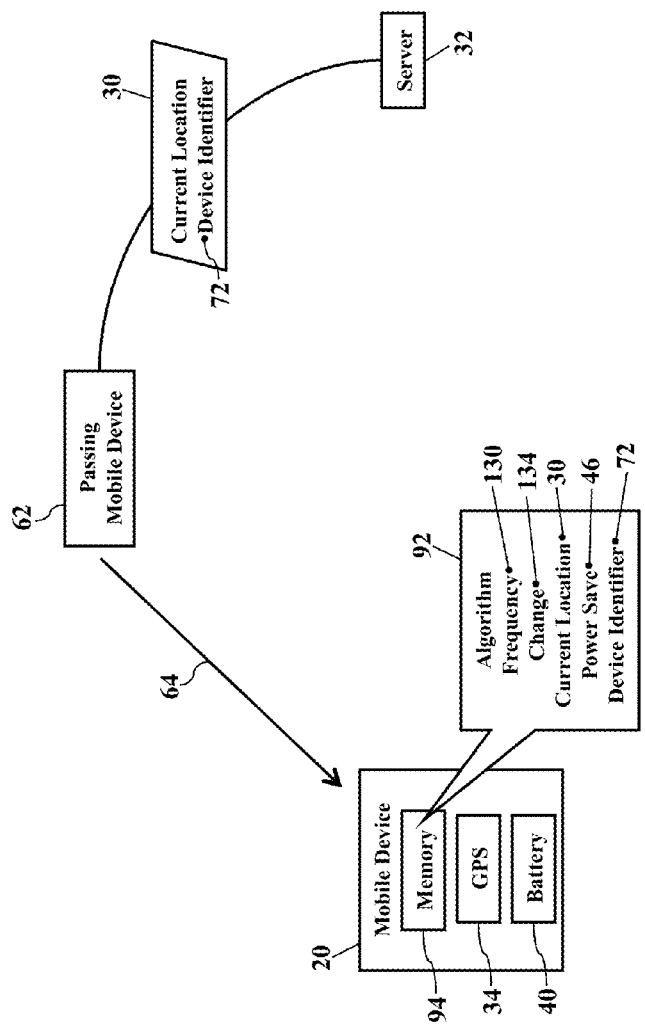

FIG. 16 illustrates more timing considerations. Here the algorithm 92 may monitor a change in the frequency 130. As the acknowledgement 64 is received, the frequency 130 will change with movement of the passing mobile device 62. The frequency 130, for example, will increase as the passing mobile device 62 approaches the lost mobile device 20, according to the Doppler effect. The frequency 130 will then decrease as the passing mobile device 62 moves away from the lost mobile device 20. The algorithm 92 may thus cause the lost mobile device 20 to monitor a change 134 in the frequency 130 over time of the acknowledgement 64 sent from the passing mobile device 62. If the frequency 130 is increasing, the algorithm 92 may conclude that time permits awakening the global positioning system 34. That is, the global positioning system 34 is instructed to determine a new value of the current location 30, as the passing mobile device 62 is approaching the lost mobile device 20. When, however, the frequency 130 is decreasing, the passing mobile device 62 is moving away from the lost mobile device 20, so the algorithm 92 may decline to awaken the global positioning system 34. Time may only permit retrieval of the current location 30 previously generated prior to the power save 46.

Figure 17:
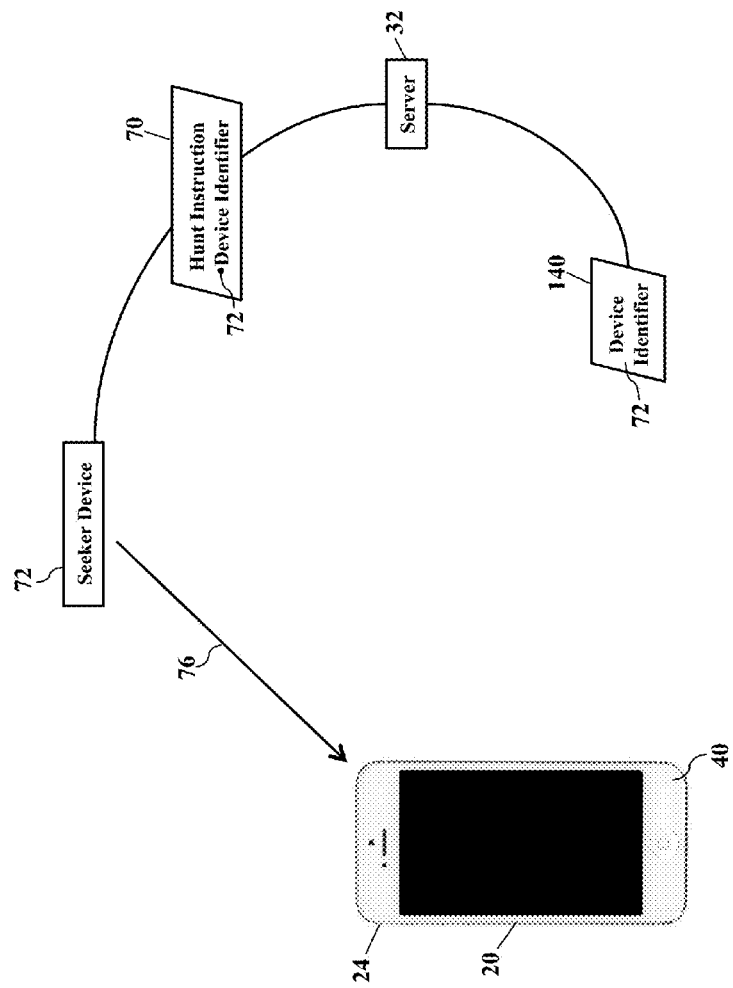
FIGS. 17-18 are schematics illustrating partnership recovery, according to exemplary embodiments.
Figure 18:
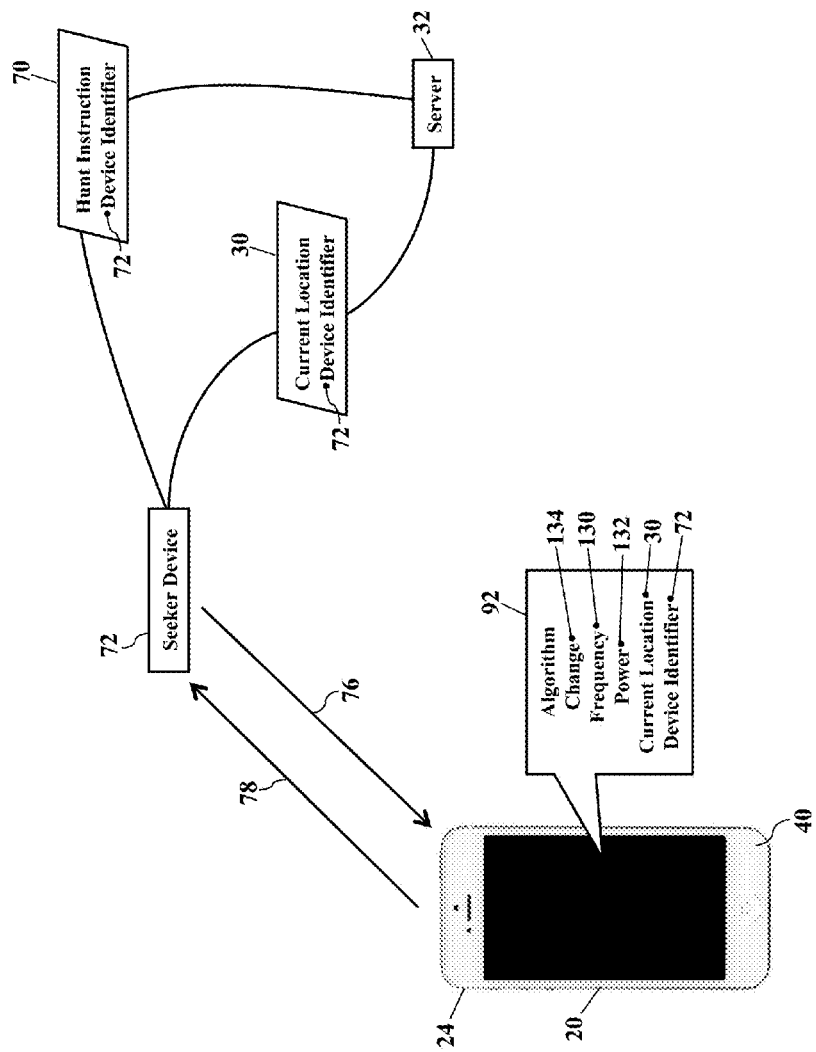

FIGS. 17-18 are schematics illustrating partnership recovery, according to exemplary embodiments. There will be many times when the mobile device 20 is reported lost by its owner, perhaps prior to self-determination. The server 32, for example, may receive a message 140 indicating the device identifier 72 of the lost mobile device 20. The owner may thus call, text, or email some central number or address to alert of the lost mobile device 20. The server 32, in response, may issue an all points bulletin to spur discovery. The server 32, for example, may broadcast the hunt instruction 70, thus compelling or conscripting any or all networked devices to hunt for, or seek out, the lost mobile device 20 associated with the device identifier 72. Each seeker device 74 transmits the interrogation signal 76 specifying the device identifier 72. Each seeker device 74 thus searches for the lost mobile device 20, in response to the hunt instruction 70.

FIG. 18 illustrates discovery. When the lost mobile device 20 receives the interrogation signal 76, the lost mobile device 20 sends its current location 30 in the response 78. The current location 30 may be retrieved from the memory (illustrated as reference numeral 94 in FIG. 10) or newly generated, based on the change 134 in the frequency 130 and/or the electromagnetic power 132 (as this disclosure explains). When the seeker device 74 receives the response 78, the seeker device 74 may verify the device identifier 72. If the device identifier 72 in the response 78 does not match the device identifier 72 received in the hunt instruction 70, discovery may have failed. Exemplary embodiments may thus retransmit the interrogation signal 76 and confirm a subsequent response. In most cases, though, the response 78 will match, thus confirming discovery. The seeker device 74 thus sends the current location 30 of the previously lost mobile device 20 back to the server 32, thus notifying the server 32 of the discovery. The server 32 may then again notify an owner or user.

Figure 19:
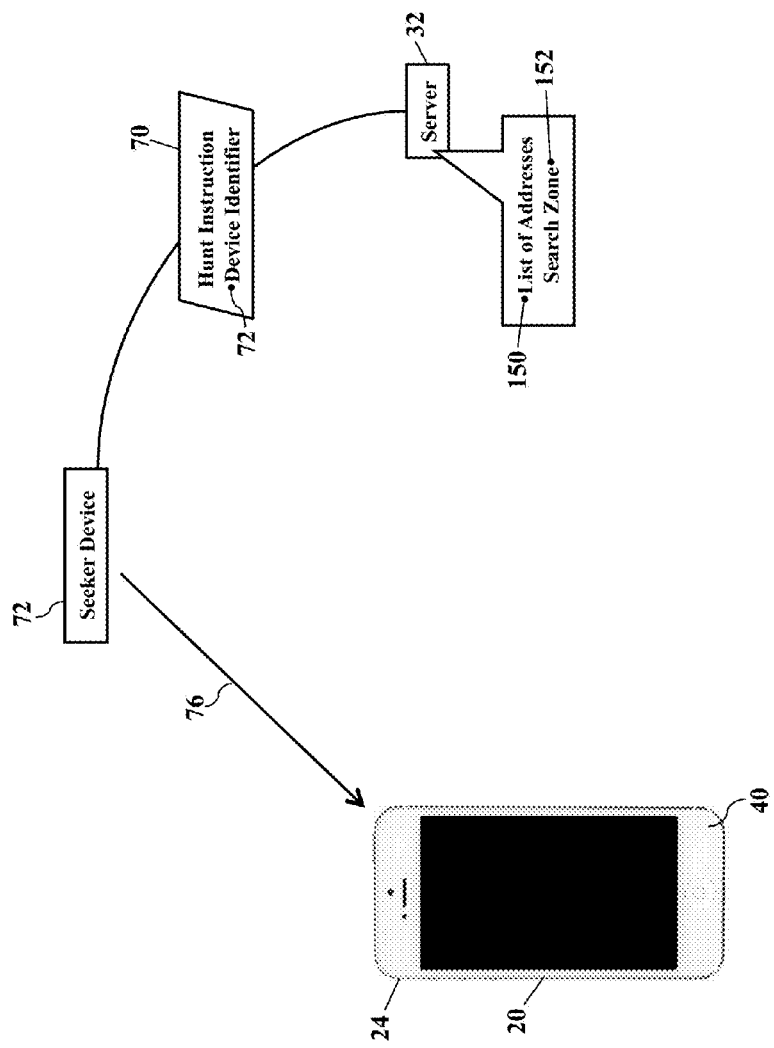
FIG. 19-20 are schematics illustrating conscription, according to exemplary embodiments.
Figure 20:
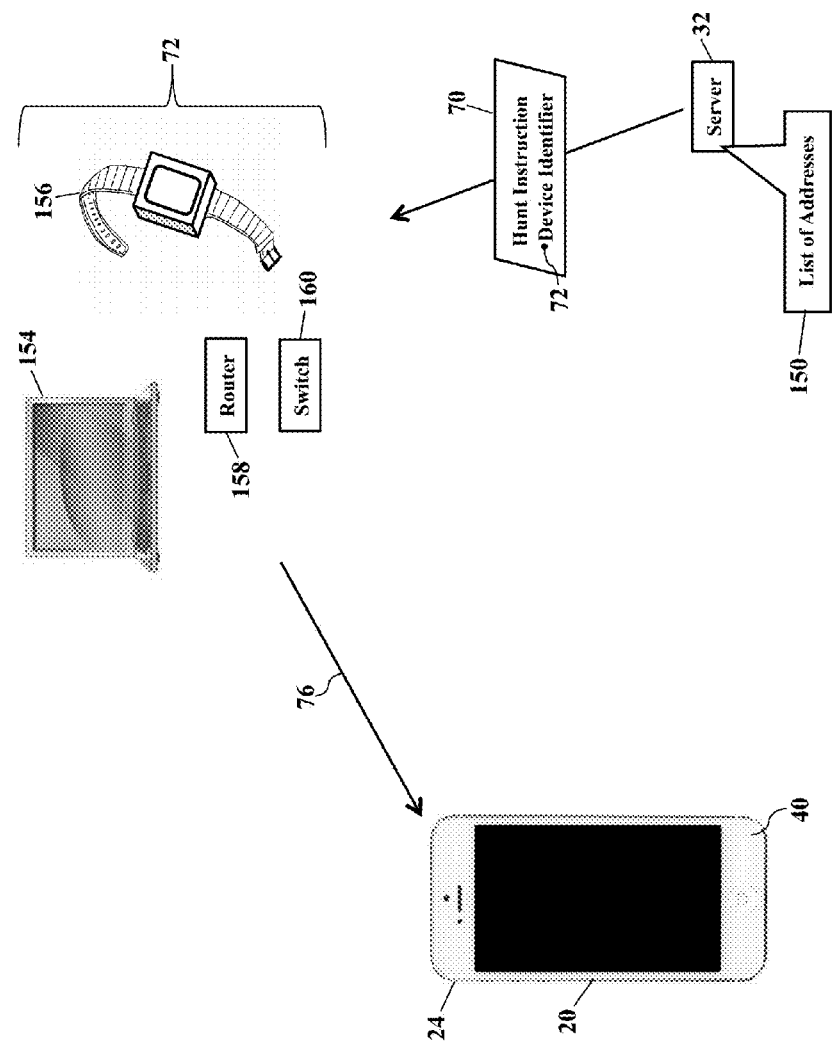

FIGS. 19-20 are schematics illustrating conscription, according to exemplary embodiments. Successful discovery of the lost mobile device 20 may depend on quick action. As time passes, the chance of recovery may become less. Exemplary embodiments, then, may conscript any networked device in an area for a search and recovery operation. The server 32, for example, may retrieve a list 150 of addresses associated with a search zone 152. The search zone 152 may be any area for which the search and recovery operation is undertaken. The search zone 152, for example, may be a network name, group of devices, or even a geographic area. Regardless, the server 32 may send the hunt instruction 70 in a message to any one or more network addresses in the list 150 of addresses. Each corresponding seeker device 72 is thus compelled to transmit the interrogation signal 76.

FIG. 20 illustrates stationary devices. Search and discovery is not limited to mobile devices. As this disclosure explains, any networked device, whether stationary or mobile, may be drafted as one of the seeker devices 72. The list 150 of addresses may thus include any networked stationary device, such as a computer 154, a watch 156, a router 158, a switch 160, and any other computing or networking device that can receive the hunt instruction 70 and/or transmit the interrogation signal 76. The list 150 of addresses may also include other networked devices, such as refrigerators, washing machines, electric meters, and other appliances. In short, any processor-controlled networked device may be conscripted for search and discovery efforts.

Figure 21:
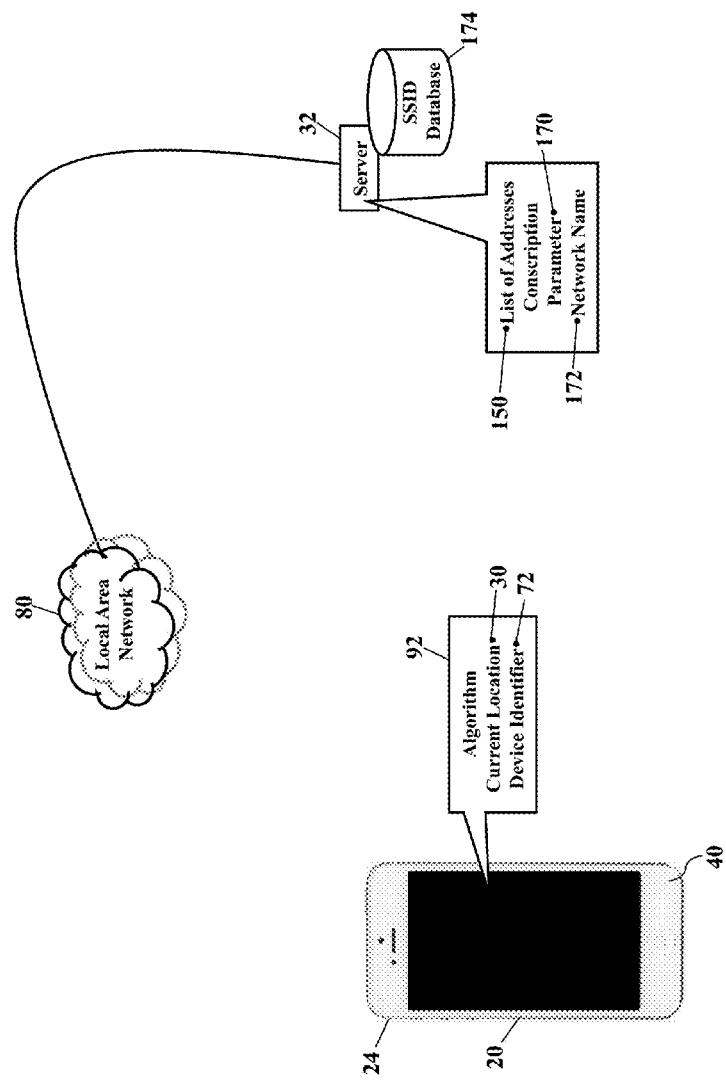
FIGS. 21-26 are schematics further illustrating search zones, according to exemplary embodiments.

FIGS. 21-26 are schematics further illustrating the search zone 152, according to exemplary embodiments. When the user discovers the mobile device 20 is lost, the server 32 may initiate search and recovery within moments of notification (such as receipt of the message 140 illustrated in FIG. 17). The recovery effort, though, may start small for quicker and more targeted efforts. FIG. 21, for example, illustrates the local area network 80. Exemplary embodiments may initially conscript only the networked devices associated with the local area network 80. When the mobile device 20 is initially determined as lost, the user may first wish to only search her local area network 80 serving her home or business. When the server 32 receives the message 140, the message 140 may specify the search zone 152 with a conscription parameter 170. The conscription parameter 170 may define, describe, or limit the search zone 152 of the search and recovery effort. The conscription parameter 170, for example, may be the network name 172 of the local area network 80 for which the search is conducted. Most misplaced devices are likely found in the home or place of work, so the conscription parameter 170 limits the search to one or more highly probable areas of recovery.

Search and recovery efforts may thus be limited to the conscription parameter 170. When the server 32 receives the conscription parameter 170, the server 32 may only conscript the devices associated with the conscription parameter 170. For example, if the conscription parameter 170 specifies the name 172 of the local area network 80, the algorithm 92 may only conscript the devices registered with the same local area network 80. The algorithm 92 may thus query an SSID database 174 for the conscription parameter 170.

Figure 22:
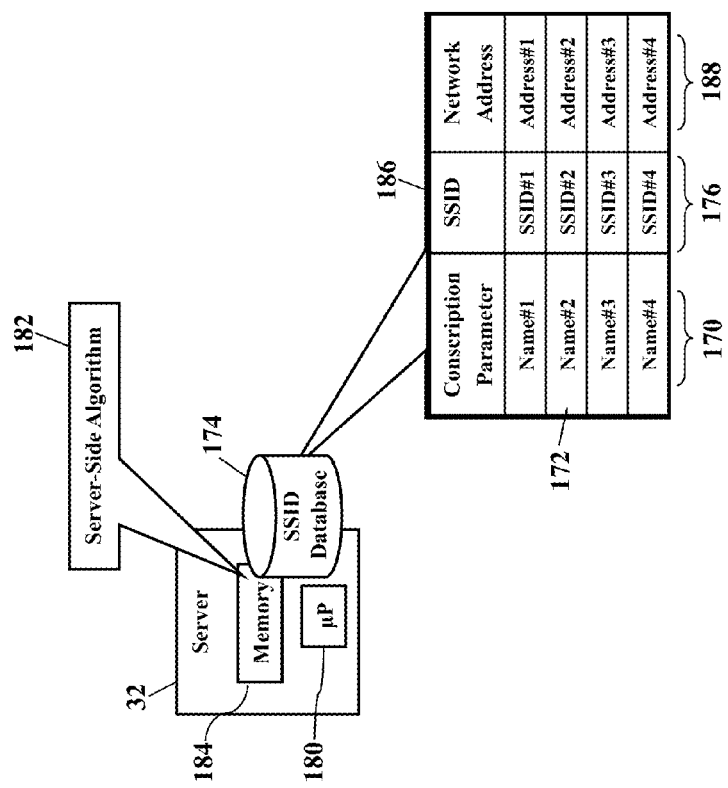

FIG. 22 illustrates the SSID database 174. When the server 32 receives the conscription parameter 170 (such as the network name 172), the server 32 retrieves the corresponding service set identifier (or "SSID") 176. The server 32 has a processor 180 that executes a server-side algorithm 182 stored in a memory 184. The server-side algorithm 182 instructs the processor 180 to execute operations, such as querying the SSID database 174. The SSID database 174 may be locally stored in the server 32 or remotely maintained and queried from any network location or address. Regardless, the SSID database 174 is illustrated as a table 186 that maps different conscription parameters 170 to different service set identifiers 176 and their corresponding network addresses 188. Each different wireless local area network has the unique service set identifier 176. The server 32 may thus retrieve the service set identifier 176 and/or the network address 188 associated with the conscription parameter 170.

Figure 23:
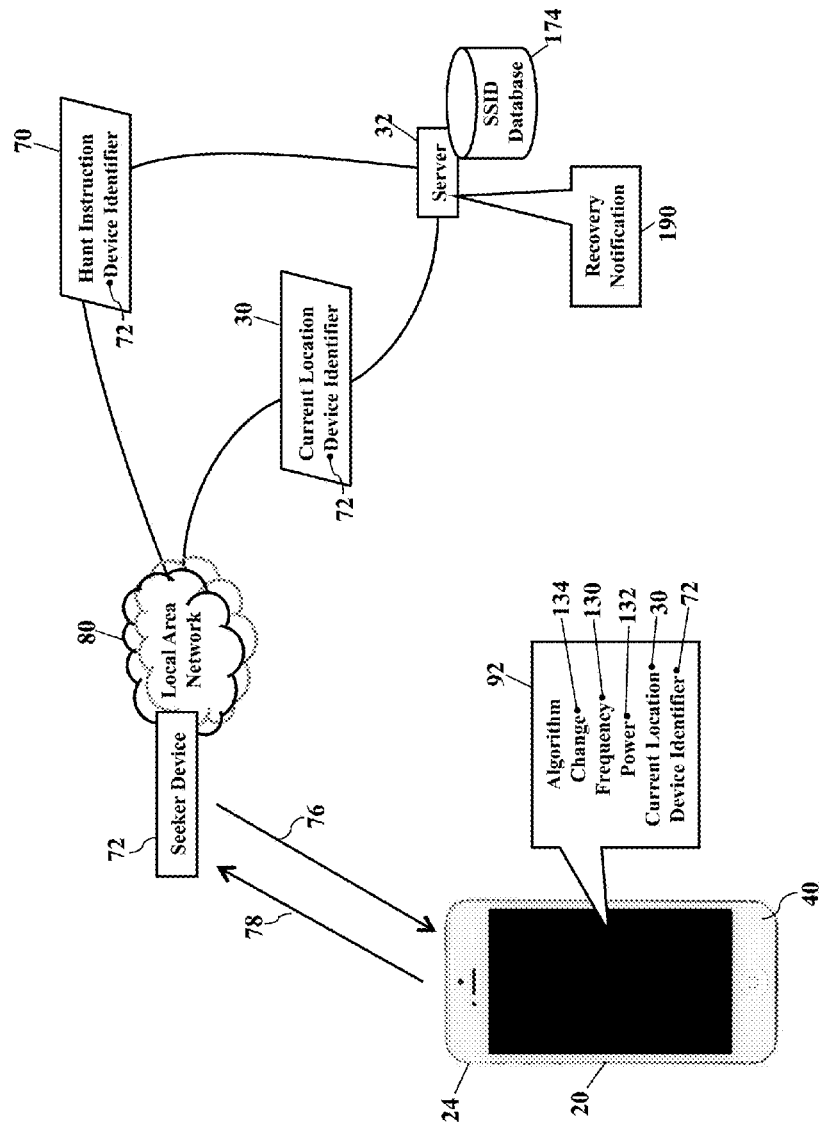

FIG. 23 further illustrates conscription. Now that the service set identifier 176 and/or the network address 188 is known, the server 32 drafts the networked devices associated with the same service set identifier 176 and/or the network address 188. The server 32, for example, sends the hunt instruction 70 to the modem, router, switch, gateway, or access point identified by the network address 188 retrieved from the SSID database 174 (as FIG. 22 illustrated). The server 32 may thus limit the hunt instruction 70 to only those networked devices registered with the user's residential or business wireless network. The conscripted seeker devices 72 are thus commanded to transmit the interrogation signal 76. If the lost mobile device 20 is within reception range of any of the networked seeker devices 72 registered with the local area network 80, then the lost mobile device 20 will receive the interrogation signal 76. The lost mobile device 20 sends its current location 30 in the response 78. The current location 30 may be retrieved from the memory 94 or newly generated, based on the frequency 130 and/or the power 132 (as this disclosure previously explained). The seeker device 74 thus forwards the current location 30 of the previously lost mobile device 20 back to the server 32, thus notifying the server 32 of the discovery. The server 32 may then send a recovery notification 190 in response to the message 140, detailing the current location 30 reported by the found mobile device 20.

The search may be repeated for different networks. If the initial search of the local area network 80 fails, then no seeker device 74 was able to establish communication with the lost mobile device 20. The user may thus opt to search a different local area network. The user, in other words, may resubmit a different conscription parameter 170 associated with a different local area network. The user, for example, may request search and recovery efforts using a neighbor's WI-FI® network or a different business network. The user may thus repeatedly search different local area networks until the lost mobile device 20 is found. The user, for example, may submit search queries for "Target at Town Mall" or "Home Depot on Main Street." The server 32 may thus query the SSID database 174 for the same or nearly the same text string as a query parameter. The SSID database 174 may thus be a comprehensive mapping of different wireless networks for different locations, using simple or common textual and geographical descriptions. The user may thus easily search networks 80 associated with grocery stores, coffee stops, malls, and other locations in which the lost mobile device 20 may be found.

Figure 24:
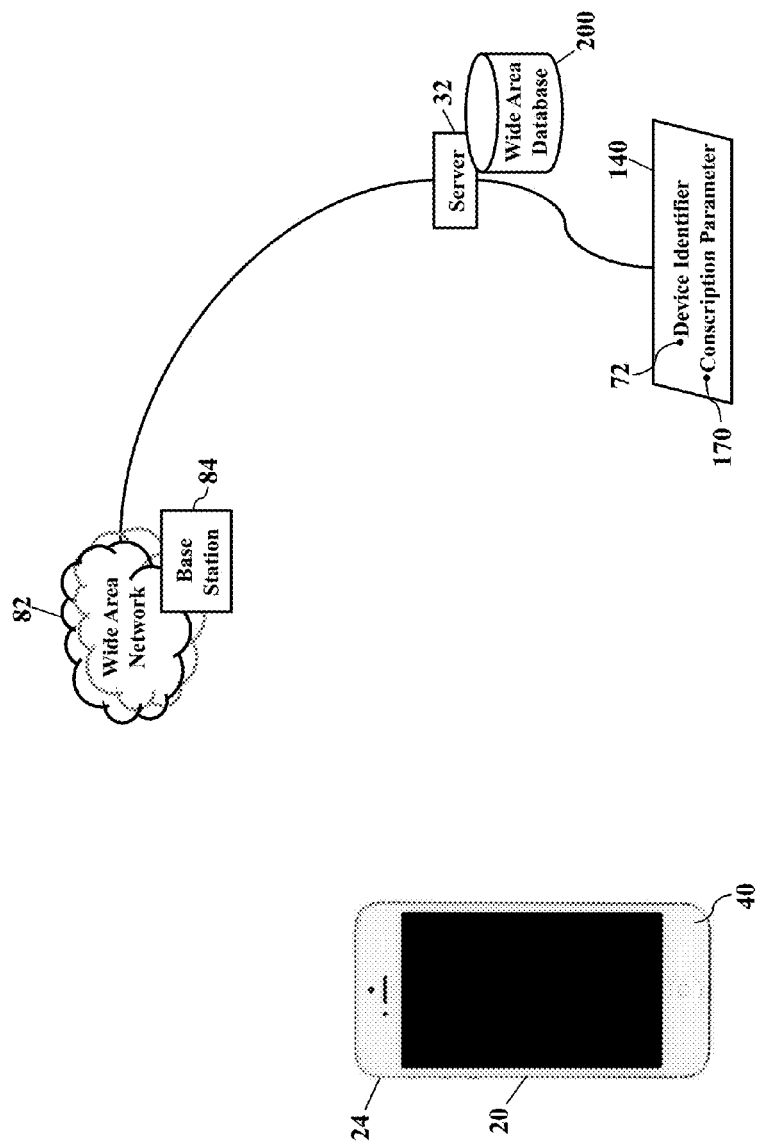

FIG. 24 illustrates an expanded search area. At some point, though, the search area may need to be expanded. If the user has enlisted the search efforts of one or more local area networks without success, the user may wish to enlarge the recovery effort. The user may thus request a wide area search. The message 140, then, may specify the conscription parameter 170 associated with the wide area network 82. Suppose the owner wishes to search the nearest major intersection to her house, in the hopes of finding her lost mobile device 20. The conscription parameter 170, then, may be a textual description of intersecting streets (e.g., "Prospect and River in Bergenfield N.J."). The conscription parameter 170, however, may be any geographical identifier, such as a physical address or a zonal postal (or "ZIP") code. Indeed, if the owner is truly despaired, the conscription parameter 170 may even encompass a town, city, state, or region.

Figure 25:
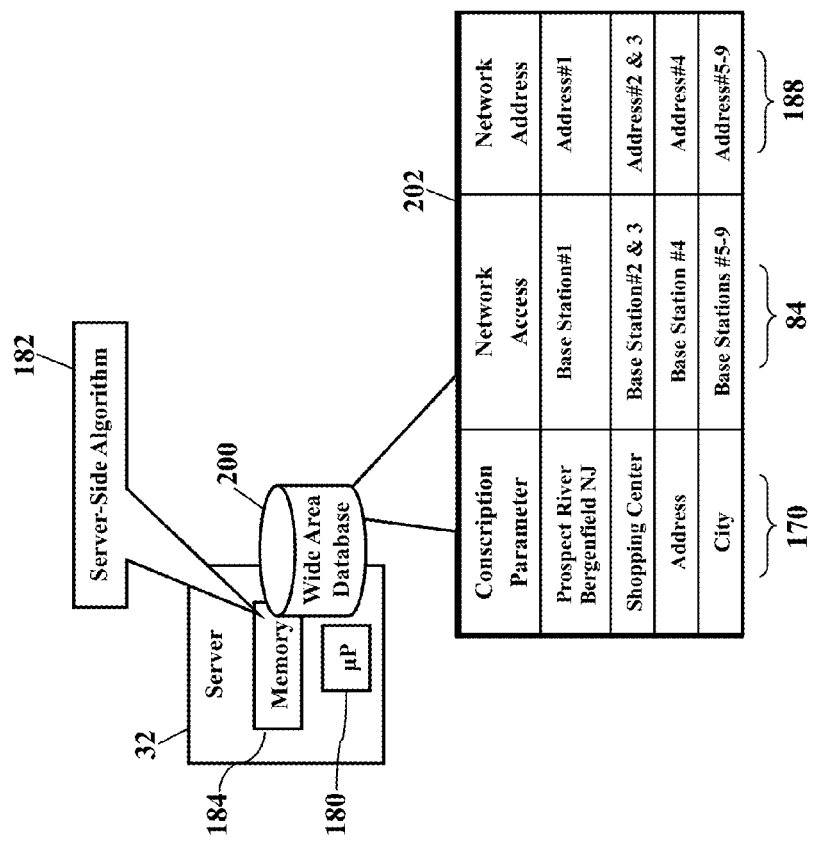

Exemplary embodiments thus expand the search and recovery efforts. When the server 32 receives the message 140, the server 32 may again conscript the devices associated with the conscription parameter 170. The server 32 may thus query a wide area database 200 for the conscription parameter 170. The wide area database 200 may be any network repository that reveals the devices operating at the user's query parameter (e.g., "Prospect and River in Bergenfield N.J."). The wide area database 200, for example, may be a home location register and/or a visitor location register that reveals mobile devices by location. The wide area database 200, however, translates the owner's simple text query into network routing and/or registrations for devices in a geographic area. FIG. 25, for example, illustrates the wide area database 200 stored within the server 32, but the wide area database 200 may be remotely maintained and queried at some other location. The wide area database 200 is illustrated as a table 202 that maps different conscription parameters 170 to different network routing information (such as the network address 188 of the cellular base station 84). The wide area database 200, in other words, translates the owner's query (e.g., "Prospect and River in Bergenfield N.J.") into the serving cellular base station 84.

Figure 26:
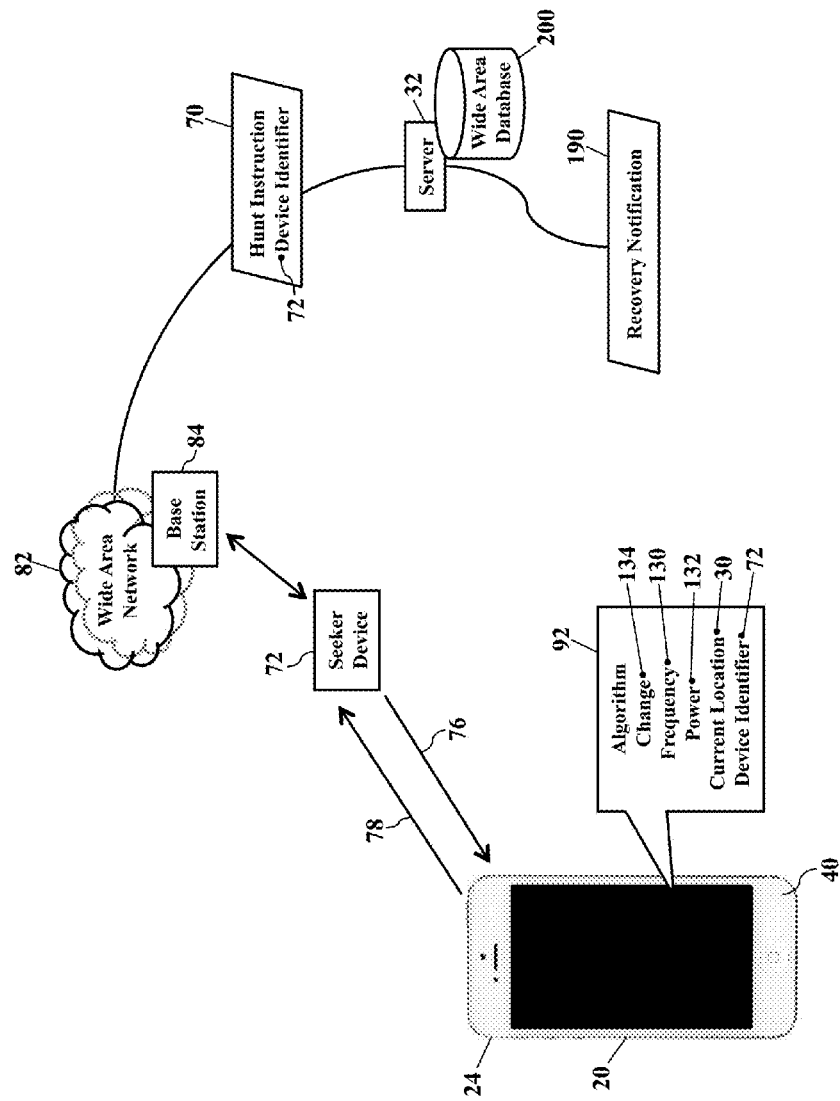

As FIG. 26 illustrates, the server 32 then issues the hunt instruction 70. The hunt instruction 70 routes to the network address 188 associated with the base station 84 retrieved from the wide area database 200. The hunt instruction 70 instructs the base station 84 to broadcast the interrogational signal 76 to one, some, or all of the networked seeker devices 72 in its coverage area. All devices registered with the cellular base station 84, in other words, may be compelled to search for the lost mobile device 20. If the lost mobile device 20 is within reception range of any of the seeker devices 72, then the lost mobile device 20 will receive the interrogation signal 76. The lost mobile device 20 sends its current location 30 in the response 78. The current location 30 may be retrieved from the memory 94 or newly generated, based on the change 134 in the frequency 130 and/or the power 132 (as previously explained). The seeker device 74 thus forwards the current location 30 of the previously lost mobile device 20 back to the server 32, thus notifying the server 32 of the discovery. The server 32 may then send the recovery notification 190 to any destination, detailing the current location 30 reported by the found mobile device 20.

Figure 27:
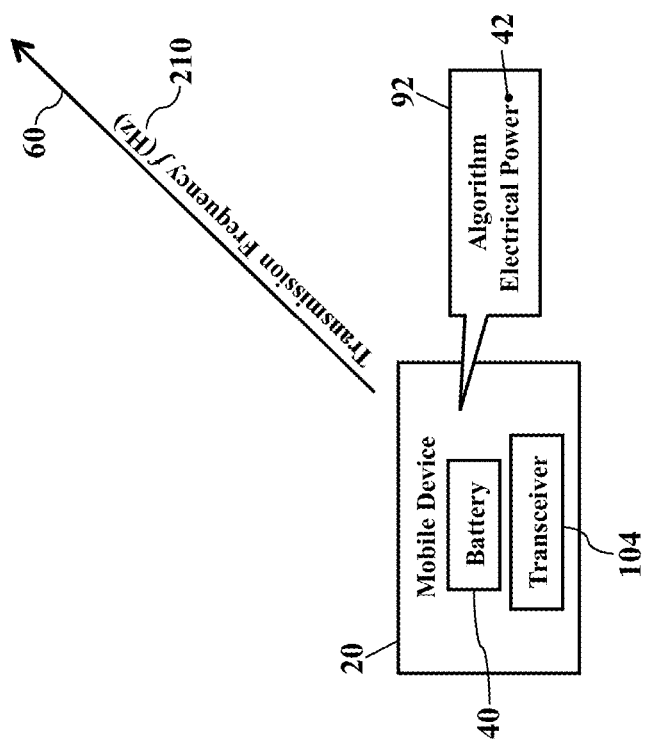
FIGS. 27-29 are schematics illustrating a recovery signal, according to exemplary embodiments.
Figure 28:
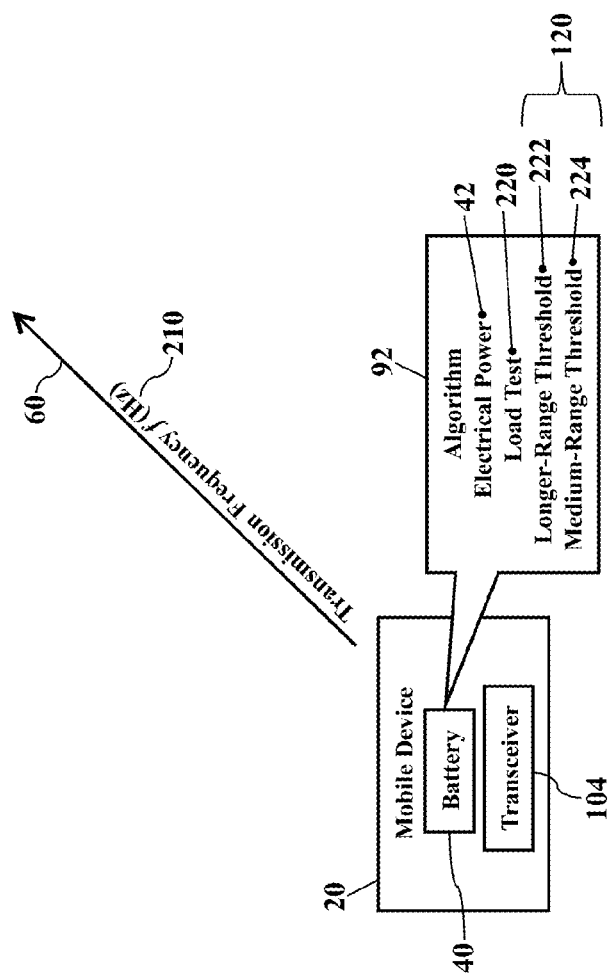
Figure 29:
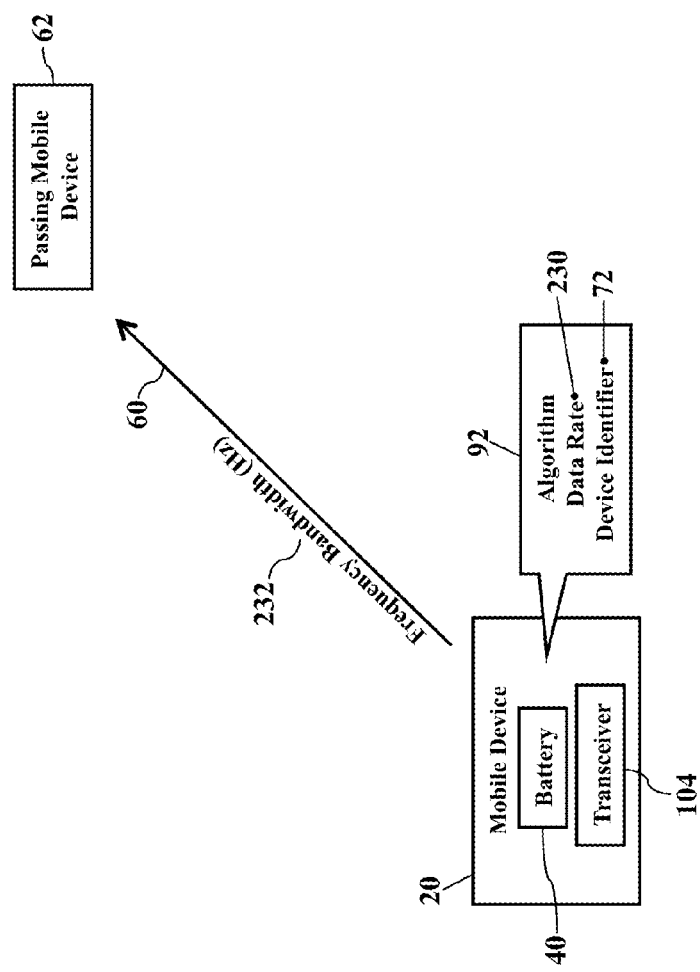

FIGS. 27-29 are schematics illustrating the recovery signal 60, according to exemplary embodiments. The recovery signal 60 is sent by the mobile device 20, in an effort to spur its recovery (as explained with reference to FIGS. 5-6 & 13-14). The algorithm 92 may thus instruct the transceiver 104 to wirelessly transmit the recovery signal 60 using any transmission frequency 210 in the electromagnetic spectrum. For example, if the battery 40 has a nearly full charge, the transceiver 104 may wirelessly transmit the recovery signal 60 using a higher transmission frequency 210, which would require more electrical power 42 from the battery 40. However, if the battery 40 has a low charge, the transceiver 104 may wirelessly transmit the recovery signal 60 using a lower transmission frequency 210, which would require consuming less electrical power 42 from the battery 40. The transmission frequency 210, of course, depends on the capabilities of the transceiver 104. The smartphone 24, for example, may have multiple transceivers 104 for cellular radio frequencies (e.g., >700 MHz), for Gigahertz frequencies (e.g., 2.4 and 5 GHZ WI-FI® and BLUETOOTH®), and for near-field frequencies (e.g., 13-14 MHz). Indeed, the mobile device 20 may have one or several transmitters for different transmission frequency bands. Exemplary embodiments may thus transmit the recovery signal 60 using any transmission frequency 210 desired.

Recovery, though, likely depends on transmission range. The transmission frequency 210 of the recovery signal 60 is related to the transmission range. Those of ordinary skill in the art understand that signals transmitted at higher frequencies may propagate farther than signals transmitted at lower frequencies. Because higher frequency signals may travel farther, the mobile device 20 is more likely to be found using a longer range, higher frequency recovery signal 60. However, higher frequency signals require greater output transmission power from the transceiver 104, which depletes the battery 40 much faster that shorter range, lower frequency signals.

FIG. 28 thus illustrates the threshold power levels 120. Exemplary embodiments may select the transmission frequency 210 based on the electrical power 42 currently available from the battery 40. If the battery 40 is nearly fully charged, for example, the battery 40 may have plenty of electrical power 42 for longer-range transmissions. If the battery is low, though, low-power transmission may be preferred to reduce consumption of the electrical power 42 from the battery 40. The recovery signal 60, in other words, may be transmitted using higher frequencies at higher charges and transmitted at lower frequencies at lower charges. Prior to transmission, then, exemplary embodiments may load test 220 the battery 40. Exemplary embodiments may thus subject the battery 40 to any test (such as a resistive load) to determine its current electrical power 42. Once the current electrical power 42 is determined, the current electrical power 42 may be compared to a long-range threshold 222. The long-range threshold 222 may define the available electrical power 42 from the battery at which longer-range transmissions are safe to execute. If the electrical power 42 available from the battery 40 is greater than the long-range threshold 222, then the recovery signal 60 may be transmitted using any longer range, higher transmission frequency 210. If the electrical power 42 available from the battery 40 is equal to the long-range threshold 222, then exemplary embodiments may transmit the recovery signal 60 at the highest possible transmission frequency 210, given the current charge of the battery 40. Exemplary embodiments may thus exhaust the high-frequency capability on one last, final gasp at discovery using longer-range transmission.

Other thresholds 120 may be configured. Exemplary embodiments may configure or define a medium-range threshold 224. The medium-range threshold 224 defines the available electrical power 42 from the battery 40 at which medium-range transmissions are safe to execute, such as Gigahertz frequencies (e.g., WI-FI® and BLUETOOTH®). If the electrical power 42 available from the battery 40 is less than the long-range threshold 222 but greater than the medium-range threshold 224, medium-range transmissions are safe to execute. However, if the electrical power 42 available from the battery 40 is less than the medium-range threshold 224, then exemplary embodiments may default to lower frequency, shorter-range communications (such as sub-Gigahertz) that may consume the least electrical power 42 from the battery 40. The transmission frequency 210 of the recovery signal 60 may thus be selected based on the electrical power 42 available from the battery 40.

Exemplary embodiments thus promote discovery. If the mobile device 20 remains lost for some time, the battery 40 may discharge to a level at which long-range cellular transmission is not feasible. The battery 40, in other words, may lack enough power 42 to transmit cellular signals. The mobile device 20 may have thus lost communications capability with the cellular network. Exemplary embodiments, though, may still transmit signals using lower-power technologies, such as WI-FI® and BLUETOOTH®. Discovery may still be accomplished using medium and shorter-range technologies.

FIG. 29 thus illustrates the content in the recovery signal 60. As the mobile device 20 is lost, the social goal is recovery. The recovery signal 60, in other words, may have minimal informational content, such as the device identifier 72 of the lost mobile device 20. The recovery signal 60 may thus be sent using a low data rate 230 to further spur discovery. As the data rate 230 may be low, a frequency bandwidth 232 may be narrow, which may increase sensitivity of detection (such as by the passing mobile device 62).

Figure 30:
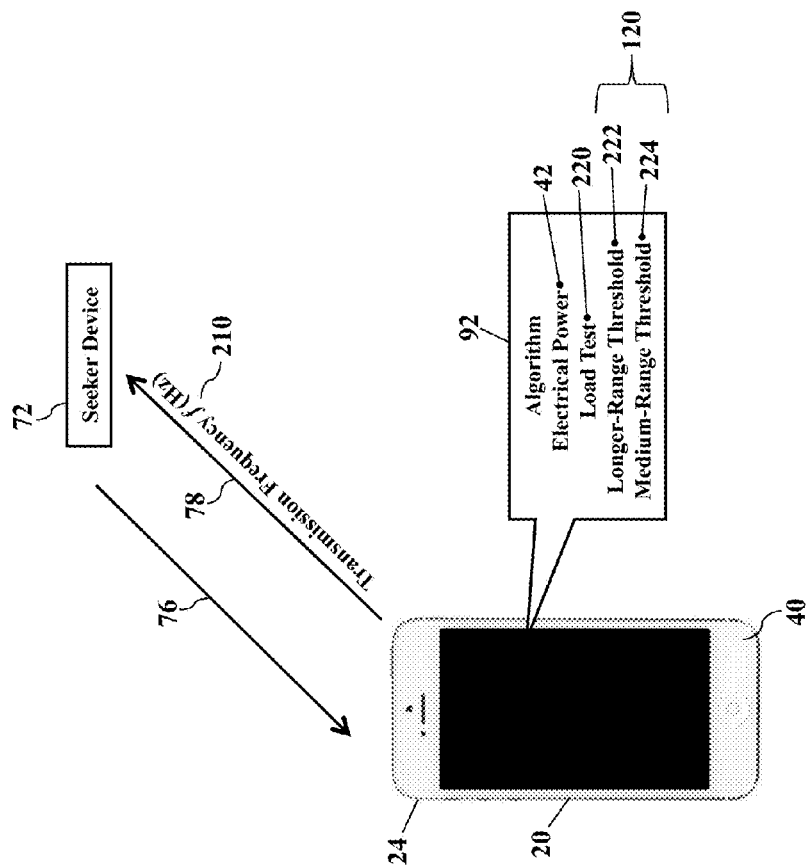
FIGS. 30-31 are schematics illustrating still more recovery mechanisms, according to exemplary embodiments.
Figure 31:
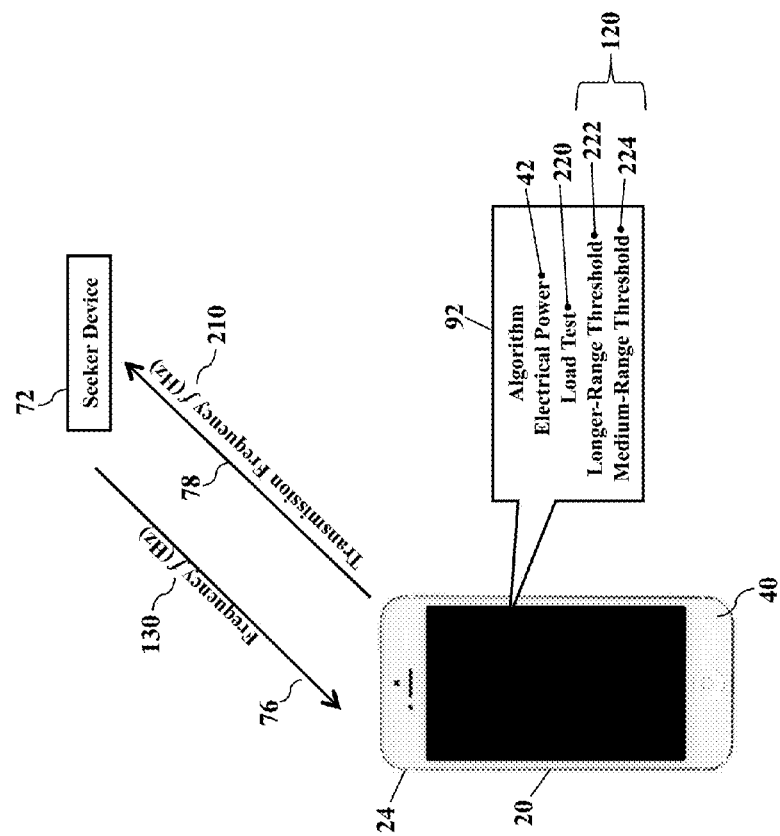

FIGS. 30-31 are schematics illustrating still more recovery mechanisms, according to exemplary embodiments. Here again the seeker device 72 may be commanded or conscripted to transmit the interrogation signal 76. If the lost mobile device 20 is within reception range, the lost mobile device 20 sends its current location 30 in the response 78. Again, though, the response 78 may be based on the electrical power 42 available from the battery 40. Before the response 78 is sent, the algorithm 92 may load test 220 the battery 40. If the battery 40 has ample charge, then the response 78 may be transmitted using higher frequencies for a longer response range. However, if the battery 40 has a low charge, then the response 78 may be transmitted using lower frequencies, resulting in a shorter response range. Exemplary embodiments may thus compare the electrical power 42 to the thresholds 120 and select the transmission frequency 210 (as explained with reference to FIG. 28).

FIG. 31, though, again illustrates Doppler considerations. When the lost mobile device 20 receives the interrogation signal 76, the algorithm 92 may again monitor the frequency 130 of the interrogation signal 76. If the frequency 130 is changing and shifting or lowering, then the seeker device 74 may be moving away from the lost mobile device 20. As recovery is the social goal, exemplary embodiments may transmit the response 78 at the highest possible transmission frequency 210, given the current charge of the battery 40. The battery 40, for example, may be exhausted for a last, final gasp at discovery.

Figure 32:
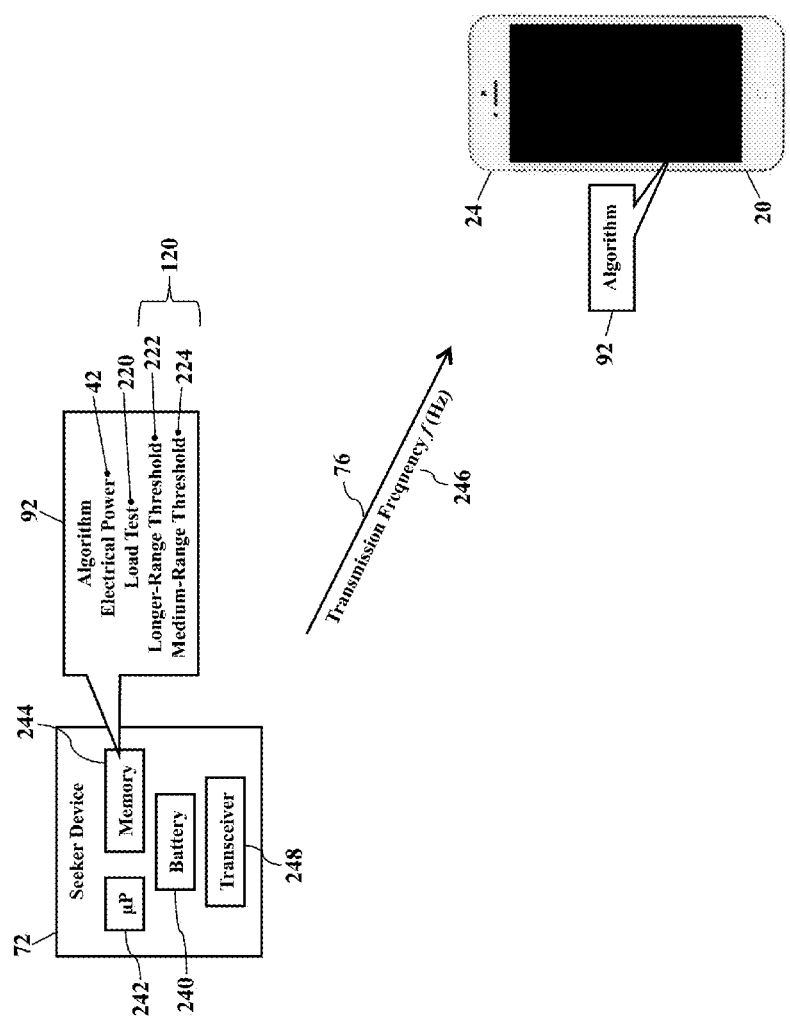
FIG. 32 is a schematic illustrating seeker considerations, according to exemplary embodiments.

FIG. 32 is a schematic illustrating seeker considerations, according to exemplary embodiments. Here the seeker device 74 need not exhaust its own battery 240 for search and recovery operations. The seeker device 74, in other words, need not be compelled to harm or jeopardize its own functionality when searching for the lost mobile device 20. So, if the seeker device 74 is conscription for search and recovery, the seeker device 74 may also monitor its battery 240 before sending the interrogation signal 76. The seeker device 74, for example, may also have a processor 242 (e.g., "µP"), application specific integrated circuit (ASIC), or other component that executes another software copy of the algorithm 92 stored in a memory 244. The algorithm 92 causes the processor 242 to perform operations, such as performing the load test 220 before sending the interrogation signal 76. As the seeker device 74 has been conscripted for search and recovery efforts, the seeker device 74 may transmit the interrogation signal 76 at higher frequencies for longer range. If, however, the seeker device 74 itself has limited electrical power 42 available from its battery 240, the thresholds 120 may be applied to the interrogation signal 76. That is, if the seeker device 74 has ample charge, then the interrogation signal 76 may be transmitted using higher frequencies for a longer search range. However, if the seeker device 74 has a low charge, then the interrogation signal 76 may be transmitted using lower frequencies to conserve the battery 240. While the owner of the lost mobile device 20 wants as large a search range as possible, the owner of the seeker device 74 need not be disadvantaged. Exemplary embodiments may thus select the transmission frequency 246 of the interrogation signal 76, based on the electrical power 42 available from the battery 240 in the seeker device 74. The transceiver 248 in the seeker device 72 may thus be chosen, based on the electrical power 42 in the battery 240.

Figure 33:
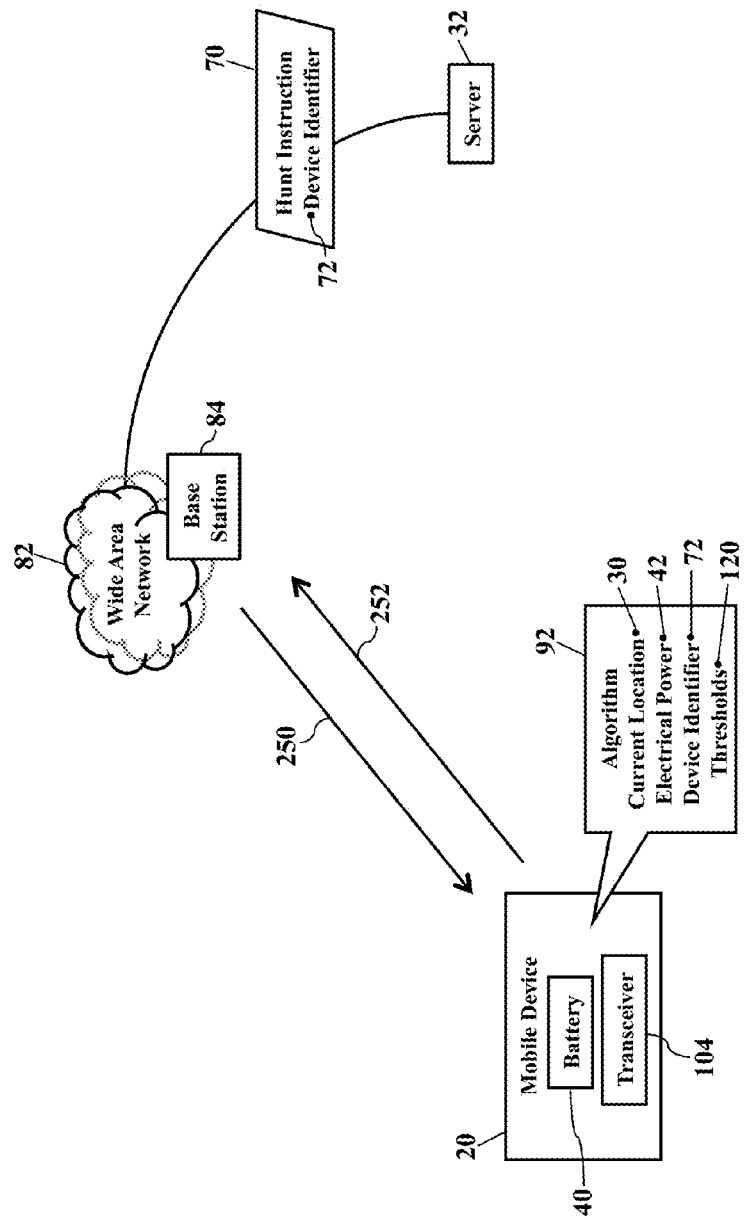
FIG. 33 is a schematic illustrating another recovery mechanism, according to exemplary embodiments.

FIG. 33 is a schematic illustrating another recovery mechanism, according to exemplary embodiments. Whenever the mobile device 20 is lost, exemplary embodiments may cause a wide area transmission of a broadcast alert 250. The server 32, for example, sends the hunt instruction 70 to the cellular base station 84. The hunt instruction 70 specifies the device identifier 72 of the lost mobile device 20. The cellular base station 84, in response, transmits the broadcast alert 250. The broadcast alert 250 may thus be targeted directly to the lost mobile device 20 (using the device identifier 72). The broadcast alert 250 instructs the lost mobile device 20 to implement recovery measures, such as responding with its current location 30 in a response 252. However, if the battery 40 is too low for cellular transmission (as compared to the thresholds 120), the lost mobile device 20 may send the current location 30 using lower-power transmissions (WI-FI®, BLUETOOTH®, or near-field), as previously explained.

The broadcast alert 250 may include other instructions. For example, the broadcast alert 250 may instruct the lost mobile device 20 to power on. That is, even if the lost mobile device 20 is turned "off," exemplary embodiments may revive the processing capabilities in the mobile device 20. The broadcast alert 250 may thus instruct the transceiver 104 to awaken and transmit the response 252. The transceiver 104 may have its own baseband processor that remains electrically powered, even if the mobile device 20 is powered down. The broadcast alert 250 may thus instruct the transceiver 104 to send the response 252.

Figure 34:
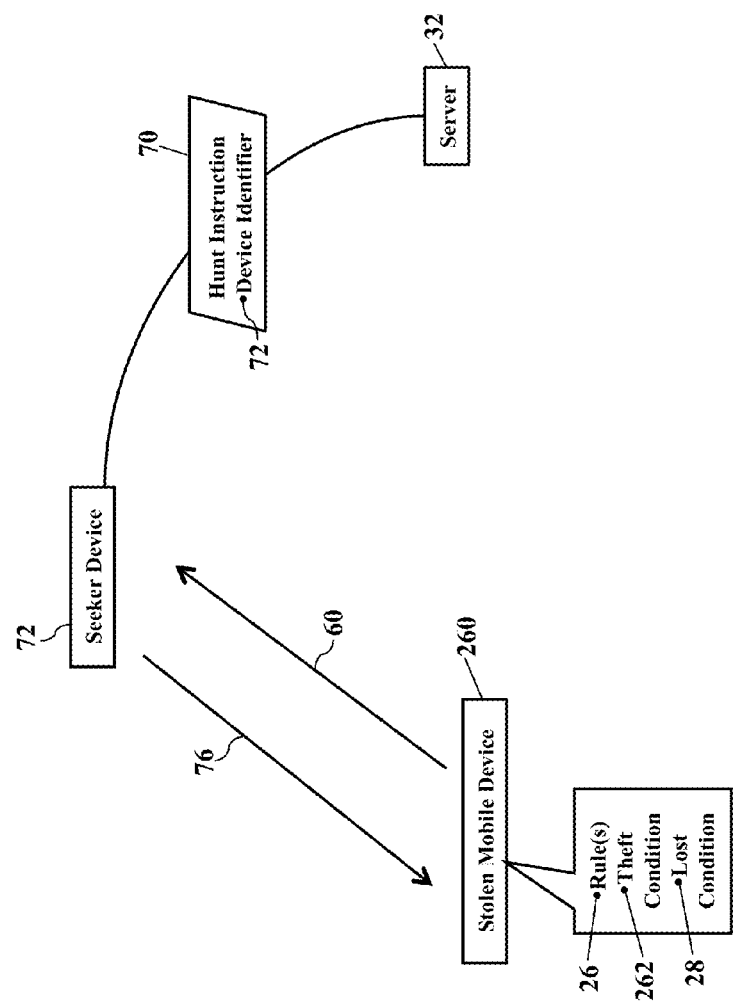
FIG. 34 is a schematic illustrating theft recovery, according to exemplary embodiments.

FIG. 34 is a schematic illustrating theft recovery, according to exemplary embodiments. This disclosure describes search and recovery operations for mobile devices. Exemplary embodiments may also be applied to search and recovery of a stolen mobile device 260. Exemplary embodiments, in other words, are equally applicable to lost or stolen mobile devices. For example, the algorithm 92 may execute the rule 26 to determine a theft condition 262. That is, exemplary embodiments may autonomously self-determine when any mobile device has been stolen, based on the rule 26. One set of rules, for example, may define the lost condition 28, which another set of rules may define the theft condition 262. Once theft is determined, exemplary embodiments may transmit the recovery signal 60 to spur recovery. Likewise, the server 32 may conscript the seeker device 72 to search for the stolen mobile device 260 (using the interrogation signal 76, as earlier explained). Once the stolen mobile device 20 is found, the rightful owner may be notified, along with law enforcement.

Figure 35:
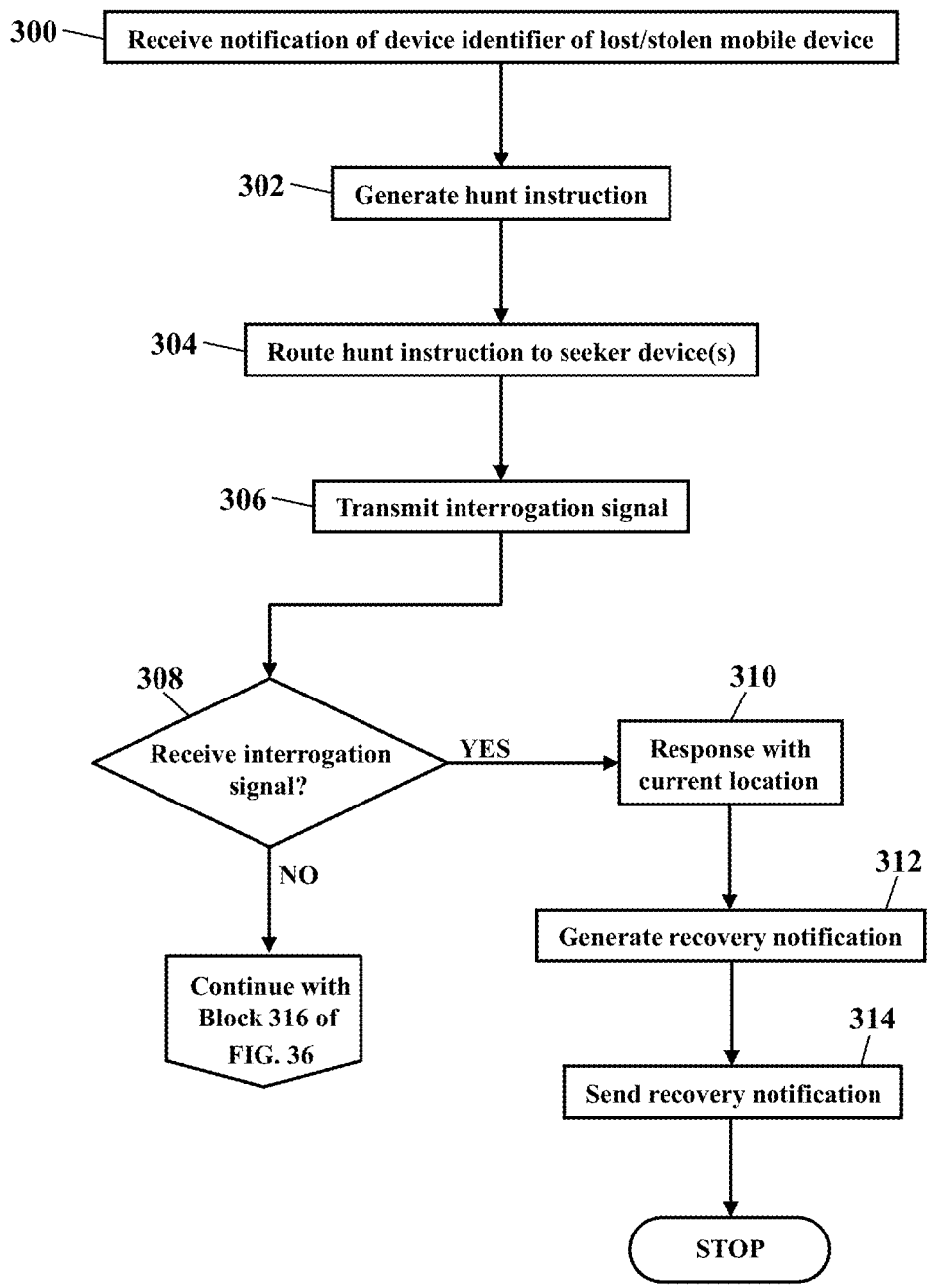
FIGS. 35-36 are flowcharts illustrating a method or algorithm for search and recovery operations, according to exemplary embodiments.
Figure 36:
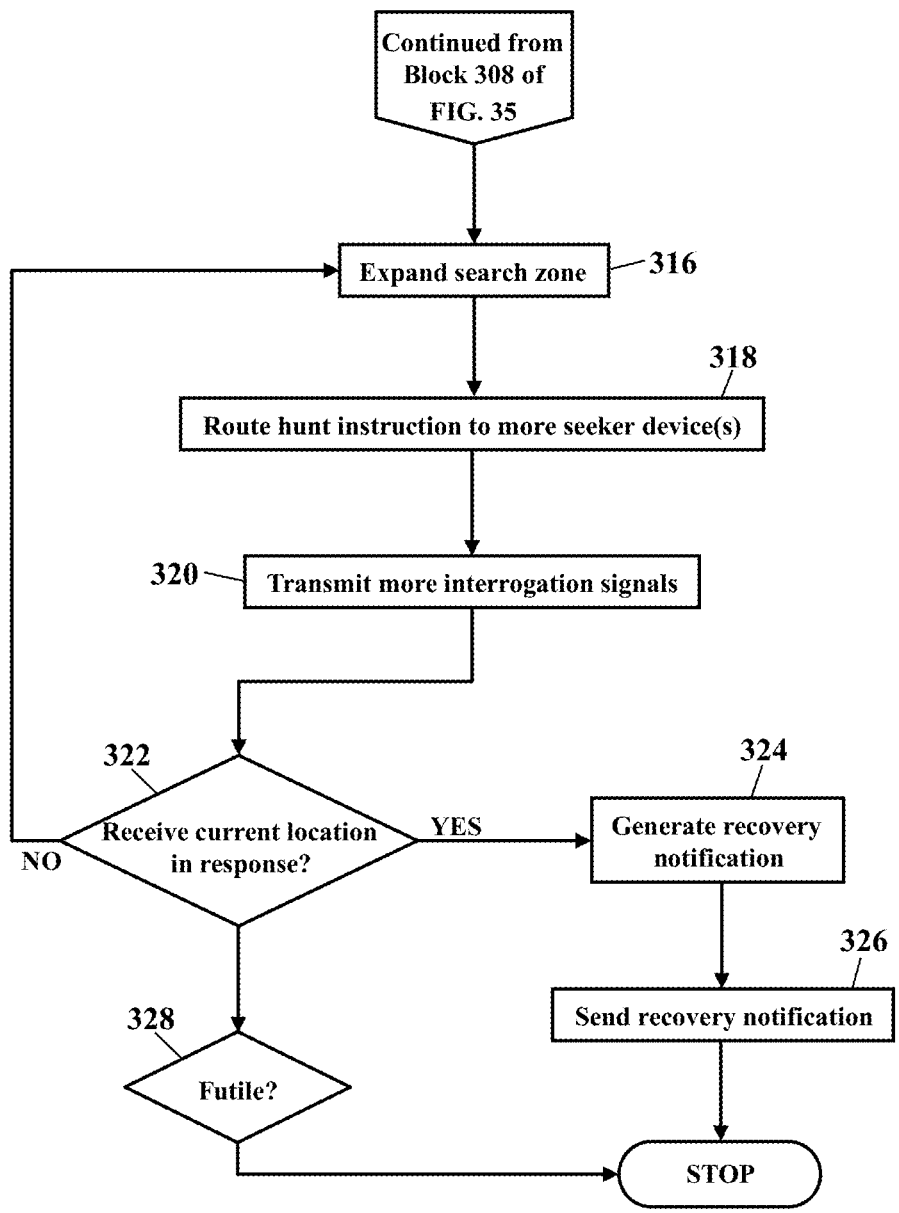

FIGS. 35-36 are flowcharts illustrating a method or algorithm for search and recovery operations, according to exemplary embodiments. The message 140 may be received, notifying of the device identifier 72 associated with the lost or stolen mobile device 20 or 260 (Block 300). The hunt instruction 70 is generated (Block 302) and routed to the seeker devices 72 (Block 304). Each seeker device 72 is instructed to transmit the interrogation signal 76 (Block 306). If the interrogation signal 76 is received (Block 308), the lost or stolen mobile device 20 or 260 its current location 30 as the response 78 (Block 310). The recovery notification 190 is generated (Block 312) and sent to a destination to confirm discovery (Block 314).

However, if the interrogation signal 76 is not received (Block 308), the flowchart continues with FIG. 36. As the initial search was unsuccessful, the search zone 152 may be expanded (Block 316) and the hunt instruction 70 is routed to more seeker devices 72 (Block 318) for transmission of more interrogation signals 76 (Block 320). If the current location 30 is received as the response 78 (Block 322), the recovery notification 190 is generated (Block 324) and sent to confirm discovery (Block 326). However, if no response is received (Block 322), the flowchart may again expand the search zone 152 (Block 316) and repeat. At some logical point, though, further searches may be futile (Block 328) and stopped.

Figure 37:
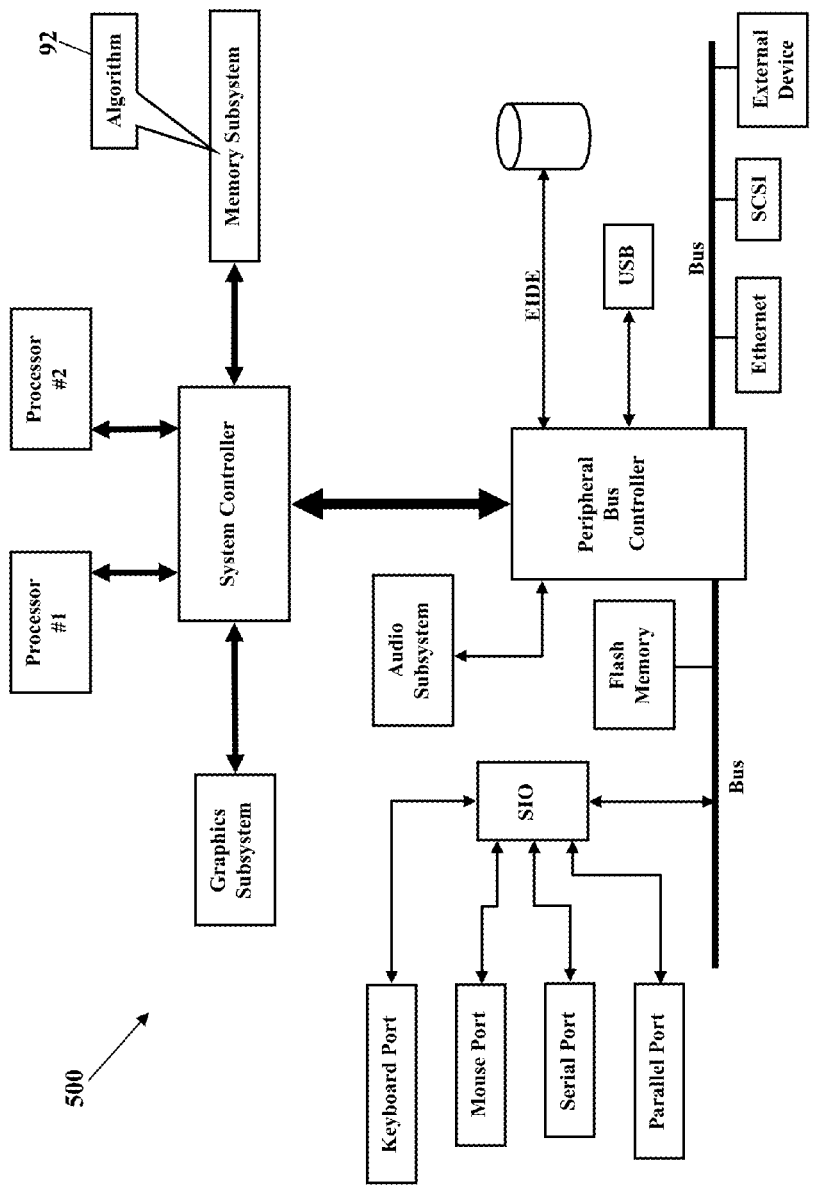
FIGS. 37-38 are schematics illustrating still more exemplary embodiments.

FIG. 37 is a schematic illustrating still more exemplary embodiments. FIG. 37 is a more detailed diagram illustrating a processor-controlled device 500. As earlier paragraphs explained, the algorithm 92 may operate in any processor-controlled device. FIG. 37, then, illustrates the algorithm 92 stored in a memory subsystem of the processor-controlled device 500. One or more processors communicate with the memory subsystem and execute either, some, or all applications. Because the processor-controlled device 500 is well known to those of ordinary skill in the art, no further explanation is needed.

Figure 38:
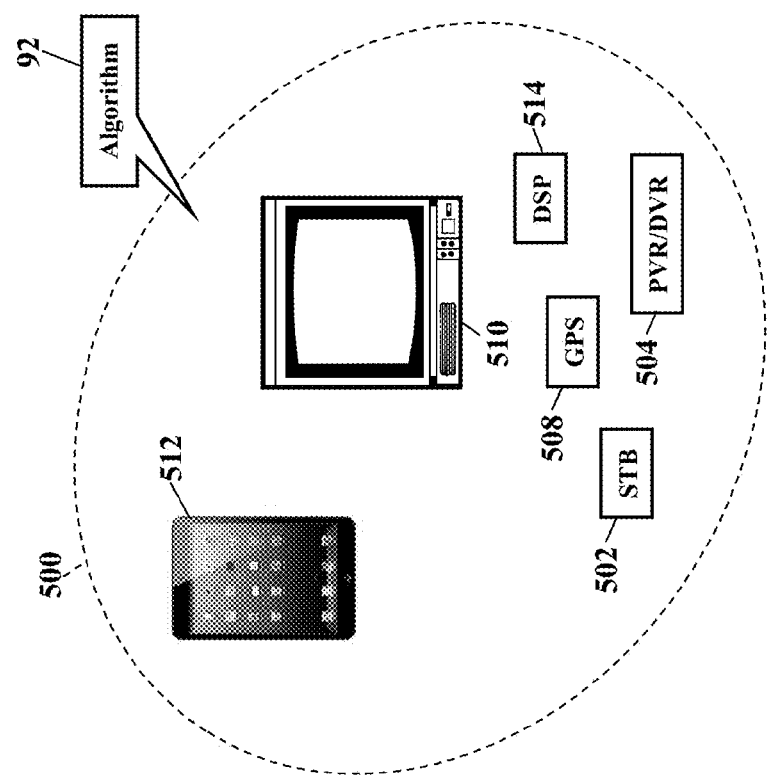

FIG. 38 depicts other possible operating environments for additional aspects of the exemplary embodiments. FIG. 38 illustrates the algorithm 92 operating within various other devices 500. FIG. 38, for example, illustrates that the algorithm 92 may entirely or partially operate within a set-top box ("STB") (502), a personal/digital video recorder (PVR/DVR) 504, a Global Positioning System (GPS) device 508, an interactive television 510, a tablet computer 512, or any computer system, communications device, or processor-controlled device utilizing a digital signal processor (DP/DSP) 514. The device 500 may also include radios, vehicle electronics, clocks, printers, gateways, mobile/implantable medical devices, and other apparatuses and systems. Because the architecture and operating principles of the various devices 500 are well known, the hardware and software componentry of the various devices 500 are not further shown and described.

Exemplary embodiments may be applied regardless of networking environment. Exemplary embodiments may be easily adapted to cellular, WI-FI®, BLUETOOTH®, and/or near-field networking technologies, as this disclosure explains. Indeed, exemplary embodiments may utilize any portion of the electromagnetic spectrum and any signaling standard (such as the IEEE 802 family of standards, GSM/CDMA/TDMA or any cellular standard, and/or the ISM band). Exemplary embodiments may use the radio-frequency domain and/or the Internet Protocol (IP) domain. Exemplary embodiments may be applied to electrical powerline wiring and/or any distributed computing network, such as the Internet (sometimes alternatively known as the "World Wide Web"), an intranet, a local-area network (LAN), and/or a wide-area network (WAN). Exemplary embodiments may be applied regardless of physical componentry, physical configuration, or communications standard(s).

Exemplary embodiments may utilize any processing component, configuration, or system. The processors 90, 180, and 242 (illustrated, respectively, in FIGS. 10, 22, and 32) may be one or multiple processors, which could include distributed processors or parallel processors in a single machine or multiple machines. The processors 90, 180, and 242 may be used in supporting a virtual processing environment. The processors 90, 180, and 242 could include a state machine, application specific integrated circuit (ASIC), programmable gate array (PGA) including a Field PGA, or state machine. When any of the processors 90, 180, and 242 execute instructions to perform "operations", this could include the processors performing the operations directly and/or facilitating, directing, or cooperating with another device or component to perform the operations.

Exemplary embodiments may be physically embodied on or in a computer-readable storage medium. This computer-readable medium may include CD-ROM, DVD, tape, cassette, floppy disk, memory card, USB, and large-capacity disks. This computer-readable medium, or media, could be distributed to end-subscribers, licensees, and assignees. A computer program product comprises processor-executable instructions for search and recovery, as the above paragraphs explained.

While the exemplary embodiments have been described with respect to various features, aspects, and embodiments, those skilled and unskilled in the art will recognize the exemplary embodiments are not so limited. Other variations, modifications, and alternative embodiments may be made without departing from the spirit and scope of the exemplary embodiments.

The invention claimed is:

1. A system, comprising:
a processor; and
a memory device, the memory device storing instructions, the instructions when executed causing the processor to perform operations, the operations comprising:
determining a lost condition associated with a lost mobile device;
determining an electrical power available from a battery powering the lost mobile device;
selecting a transmission frequency based on the electrical power available from the battery powering the lost mobile device;
proactively transmitting a recovery signal from the lost mobile device at the transmission frequency, the recovery signal transmitted for a wireless reception by an other device;
receiving an acknowledgement sent from the other device, the acknowledgment confirming receipt of the recovery signal proactively transmitted from the lost mobile device at the transmission frequency selected based on the electrical power available from the battery powering the lost mobile device;
retrieving a location associated with the lost mobile device in response to the acknowledgment; and
transmitting, from the lost mobile device, the location to the other device for recovery of the lost mobile device.

2. The system of claim 1, wherein the operations further comprise uploading the location from the other device to a server.

3. The system of claim 1, wherein the operations further comprise executing a rule to determine the lost condition associated with the lost mobile device.

4. The system of claim 1, wherein the operations further comprise comparing a current value associated with a timer to a threshold value.

5. The system of claim 1, wherein the operations further comprise:
determining the acknowledgment sent from the other device is a low power transmission;

declining to awaken a global positioning system from a power save mode in response to the acknowledgment determined to be the low power transmission; and retrieving the location generated by the global positioning system prior to the global positioning system entering the power save mode.

6. The system of claim 4, wherein the operations further comprise inferring the lost mobile device is lost in response to the current value associated with the timer exceeding the threshold value.

7. A system, comprising:
a processor; and
a memory device, the memory device storing instructions, the instructions when executed causing the processor to perform operations, the operations comprising:
determining a lost condition associated with a lost mobile device;
determining an electrical power available from a battery powering the lost mobile device;
selecting a wireless network based on the electrical power available from the battery powering the lost mobile device;
conscripting devices registered with the wireless network to hunt for the lost mobile device;
instructing the devices to broadcast an interrogation signal via the wireless network to the lost mobile device; and
receiving a current location sent from the lost mobile device in response to the interrogation signal broadcast via the wireless network from the devices conscripted for the hunt.

8. The system of claim 7, wherein the operations further comprise executing a rule to determine the lost condition.

9. The system of claim 7, wherein the operations further comprise establishing a timer to determine the lost condition, the timer counting a time without inputs by a user of the lost mobile device.

10. The system of claim 9, wherein the operations further comprise comparing a current value of the timer to a threshold value.

11. The system of claim 10, wherein the operations further comprise determining the lost condition in response to the current value of the timer exceeding the threshold value.

12. The system of claim 7, wherein the operations further comprise power saving a global positioning system in response to determining the lost condition associated with the lost mobile device.

13. The system of claim 12, wherein the operations further comprise activating the global positioning system to determine the current location of the lost mobile device.

14. A memory device storing instructions that when executed cause a processor to perform operations, the operations comprising:
determining a mobile device is lost;
determining an electrical power available from a battery powering the mobile device determined to be lost;
determining a wireless network based on the electrical power available from the battery powering the mobile device determined to be lost;
conscripting devices registered with the wireless network as seeker devices to discover the mobile device determined to be lost;
instructing the devices registered with the wireless network to broadcast an interrogation signal to discover the mobile device determined to be the lost; and
receiving a current location sent from the mobile device in response to the interrogation signal broadcast via at least one of the devices registered with the wireless network.

15. The memory device of claim 14, wherein the operations further comprise uploading the current location to an address of a server.

16. The memory device of claim 14, wherein the operations further comprise power saving a global positioning system in response to determining the mobile device is lost.

17. The memory device of claim 14, wherein the operations further comprise establishing a timer that counts a time without inputs to a user interface of the mobile device.

18. The memory device of claim 17, wherein the operations further comprise determining the mobile device is lost in response to a current value of the timer exceeding a threshold value.

19. The memory device of claim 16, wherein the operations further comprise activating the global positioning system to determine the current location of the mobile device.

* * * * *